(12) United States Patent
Zhou et al.

(10) Patent No.: US 11,561,389 B2
(45) Date of Patent: Jan. 24, 2023

(54) HIGH SPATIAL AND TEMPORAL RESOLUTION SYNTHETIC APERTURE PHASE MICROSCOPY (HISTR-SAPM)

(71) Applicant: The Chinese University of Hong Kong, Hong Kong (CN)

(72) Inventors: Renjie Zhou, Hong Kong (CN); Cheng Zheng, Jiangxi (CN)

(73) Assignee: The Chinese University of Hong Kong, Hong Kong (CN)

( * ) Notice: Subject to any disclaimer, the term of this patent is extended or adjusted under 35 U.S.C. 154(b) by 162 days.

(21) Appl. No.: 17/133,123

(22) Filed: Dec. 23, 2020

(65) Prior Publication Data

US 2021/0199586 A1    Jul. 1, 2021

Related U.S. Application Data

(60) Provisional application No. 62/954,164, filed on Dec. 27, 2019.

(51) Int. Cl.
*G02B 26/08* (2006.01)
*G02B 27/10* (2006.01)
*G01N 21/45* (2006.01)

(52) U.S. Cl.
CPC ......... *G02B 26/0833* (2013.01); *G01N 21/45* (2013.01); *G02B 27/10* (2013.01)

(58) Field of Classification Search
CPC .... G02B 26/0833; G02B 27/10; G02B 21/14; G01N 21/45; G01N 21/84; G01N 21/01
See application file for complete search history.

(56) References Cited

U.S. PATENT DOCUMENTS

2020/0081236 A1 *    3/2020    Park ................... G02B 21/0084

OTHER PUBLICATIONS

Li, L. et al., "High-performance flexible waveguide-integrated photodetectors", Optica, Jan. 2018, 5(1):44-51, Optical Society of America.
Lin, H. et al., "Chalcogenide glass-on-graphene photonics", Nature Photonics, Dec. 2017, 11.798-805, Macmillan Publishers Limited, part of Springer Nature.

(Continued)

*Primary Examiner* — Michael P LaPage
(74) *Attorney, Agent, or Firm* — Saliwanchik, Lloyd & Eisenschenk

(57) ABSTRACT

A high spatial and temporal resolution synthetic aperture phase microscopy (HISTR-SAPM) system and methods are provided for sample imaging and metrology. The HISTR-SAPM system includes a sample-illumination path along which a first illumination beam propagates and a reference-beam path along which a second illumination beam propagates. A first digital micromirror device (DMD), a second DMD, and a first scanning objective lens are disposed in the sample-illumination path and at a first side adjacent to the sample. A second scanning objective lens passes the sample information to a beam splitter (BS), where the sample illumination beam and the reference-beam are combined to form an interferogram at a final image plane for imaging the sample. A Fourier spatial spectrum analysis and a synthetic aperture are then used to reconstruct a quantitative phase map of the sample with a high resolution and at a high-speed.

19 Claims, 17 Drawing Sheets

(56) References Cited

OTHER PUBLICATIONS

Edwards, C. et al., "Optically monitoring and controlling nanoscale topography during semiconductor etching", Light: Science & Applications, 2012, e44:1-6, CIOMP.
Edwards, C. et al., "Measuring the Nonuniform Evaporation Dynamics of Sprayed Sessile Microdroplets with Quantitative Phase Imaging", Langmuir, 2015, 31:11020-11032, American Chemical Society.
Bakal, C. et al., "Quantitative Morphological Signatures Define Local Signaling Networks Regulating Cell Morphology", Science, Jun. 22, 2007, 316(5832):1753-1756.
Goda, K. et al., "Serial time-encoded amplified imaging for real-time observation of fast dynamic phenomena", Letters, Apr. 30, 2009, 458:1145-1150, Macmillan Publishers Limited.
Dardikman-Yoffe, G. et al., "High-resolution 4-D acquisition of freely swimming human sperm cells without staining", Science Advances, Apr. 10, 2020, 6(eaay7619):1-13.
Wilson, L.G. et al., "High-speed holographic microscopy of malaria parasites reveals ambidextrous flagellar waveforms", PNAS, Nov. 19, 2013, 110(47):18769-18774.
Popescu, G., "Quantitative Phase Imaging of Cells and Tissues", Biophotonics, 2011, 385 pages, McGraw-Hill.
Zhou, R. et al., "Detecting 20 nm Wide Defects in Large Area Nanopatterns Using Optical Interferometric Microscopy", Nano Letters, 2013, 13:3716-3721, American Chemical Society.
Yang, Y. et al., "Quantitative Amplitude and Phase Imaging with Interferometric Plasmonic Microscopy", ACS Nano, 2019, 13:13595-13601, American Chemical Society.
Park, Y.K. et al., "Measurement of red blood cell mechanics during morphological changes", PNAS, Apr. 13, 2010, 107(15):6731-3736.
Park, Y.K. et al., "Quantitative phase imaging in biomedicine", Nature Photonics, Oct. 2018, 12:578-589.
Greenbaum, A. et al., "Imaging without lenses: achievements and remaining challenges of wide-field on-chip microscopy", Nature Methods, Sep. 2012, 9(9):889-895, Nature America, Inc.
Greenbaum, A. et al., "Increased space-bandwidth product in pixel super-resolved lensfree on-chip microscopy", Scientific Reports, 2013, 3(1717):1-8.
Zheng, G. et al., "Wide-field, high-resolution Fourier ptychographic microscopy", Nature Photonics, Sep. 2013, 7:739-745, Macmillan Publishers Limited.
Tian, L et al., "Computational illumination for high-speed in vitro Fourier ptychographic microscopy", Optica, Oct. 2015, 2(10):904-911, Optical Society of America.
Kim, M. et al., "High-speed synthetic aperture microscopy for live cell imaging", Optics Letters, Jan. 15, 2011, 36(2):148-150, Optical Society of America.
Hillman, T.R. et al., "High-resolution, wide-field object reconstruction with synthetic aperture Fourier holographic optical microscopy", May 11, 2009, 17(10):7873-7892, Optical Society of America.
Alexandrov, S.A. et al., "Synthetic Aperture Fourier Holographic Optical Microscopy", Physical Review Letters, Oct. 20, 2006, 97(168102):1-4, The American Physical Society.
Feng, P. et al., "Long-working-distance synthetic aperture Fresnel off-axis digital holography", Optics Express, Mar. 30, 2009, 17(7):5473-5480, Optical Society of America.
Di, J. et al., "High resolution digital holographic microscopy with a wide field of view based on a synthetic aperture technique and use of linear CCD scanning", Applied Optics, Oct. 20, 2008, 47(30):5654-5659, Optical Society of America.
Granero, L. et al., "Synthetic aperture superresolved microscopy in digital lensless Fourier holography by time and angular multiplexing of the object information", Applied Optics, Feb. 10, 2010, 49(5):845-857, Optical Society of America.
Paturzo, M. et al., "Correct self-assembling of spatial frequencies in super-resolution synthetic aperture digital holography", Optics Letters, Dec. 1, 2009, 34(23):3650-3652, Optical Society of America.
Maire, G. et al., "Phase imaging and synthetic aperture super-resolution via total internal reflection microscopy", Optics Letters, May 1, 2018, 43(9):2173-2176, Optical Society of America.
Ralston, T.S. et al., "Interferometric synthetic aperture microscopy", Nature Physics, Feb. 2007, 3:129-134, Nature Publishing Group.
Luo, W. et al., "Synthetic aperture-based on-chip microscopy", Light: Science & Applications, 2015, 4(e261):1-9, CIOMP.
Mico, V. et al., "Single-step superresolution by interferometric imaging", Optics Express, Jun. 14, 2004, 12(12):2589-2596, Optical Society of America.
Yuan, C. et al., "Angular multiplexing in pulsed digital holography for aperture synthesis", Optics Letters, Oct. 15, 2008, 33(20):2356-2358, Optical Society of America.
Lin, Y.C. et al., "One-shot synthetic aperture digital holographic microscopy with non-coplanar angular-multiplexing and coherence gating", Optics Express, May 14, 2018, 26(10):12620-12631, Optical Society of America.
Picazo-Bueno, J.A. et al., "Superresolved spatially multiplexed interferometric microscopy", Optics Letters, Mar. 1, 2017, 42(5):927-930, Optical Society of America.
Shin, S. et al., "Active illumination using a digital micromirror device for quantitative phase imaging", Optics Letters, Nov. 15, 2015, 40(22):5407-5410, Optical Society of America.
Lee, K. et al., "Time-multiplexed structured illumination using a DMD for optical diffraction tomography", Optics Letters, Mar. 1, 2017, 42(5):999-1002, Optical Society of America.
He, Y. et al., "Digital Micromirror Device Based Angle-multiplexed Optical Diffraction Tomography for High Throughput 3D Imaging of Cells, Proceedings of SPIE, Feb. 28, 2020, vol. 11294, pp. 1129402-1 to 1129402-6.
Choi, W. et al., "Tomographic phase microscopy", Nature Methods, Sep. 2007, 4(9):717-719.
Kim, T. et al., "White-light diffraction tomography of unlabeled live cells", Nature Photonics, Mar. 2014, 8:256-263, Macmillan Publishers Limited.

* cited by examiner

FIG. 9A    FIG. 9B    FIG. 9C
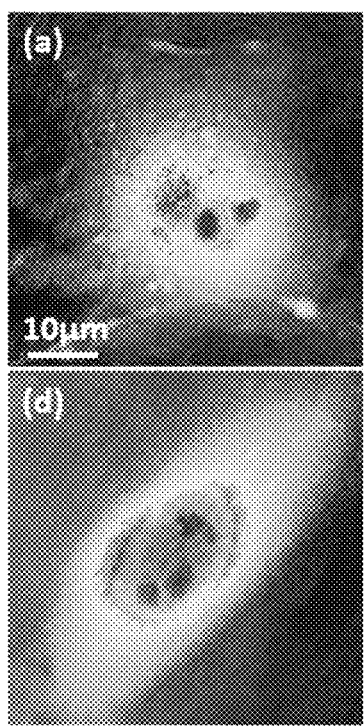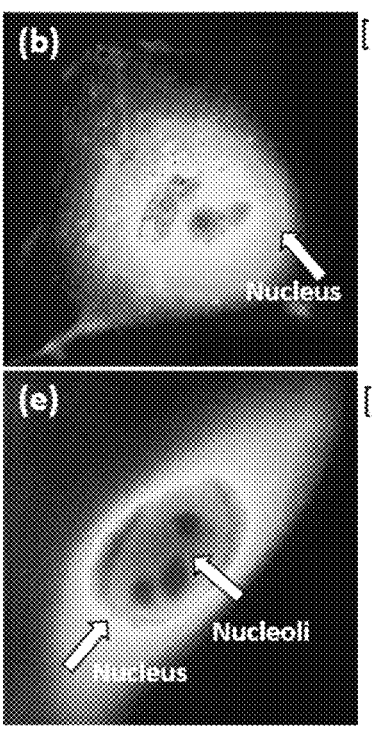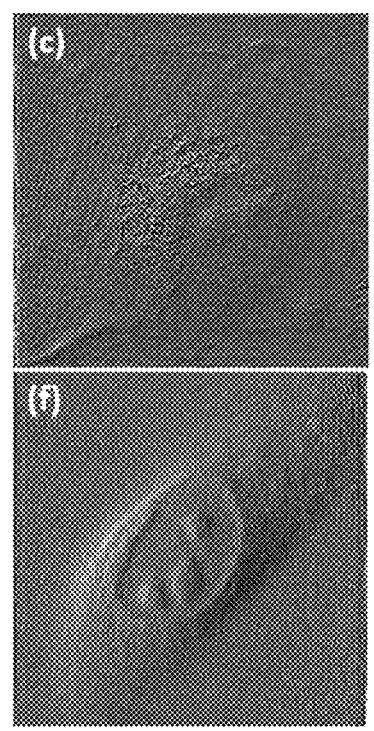
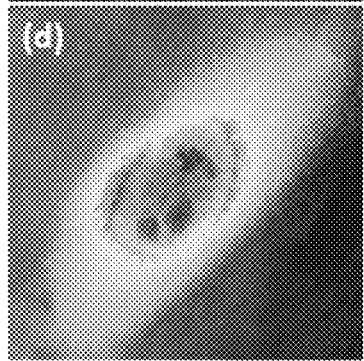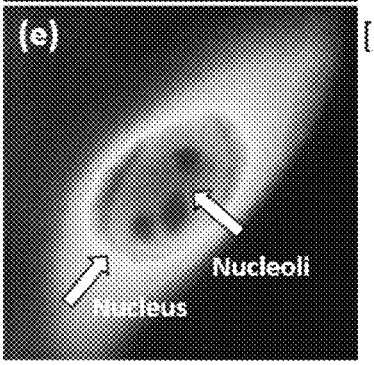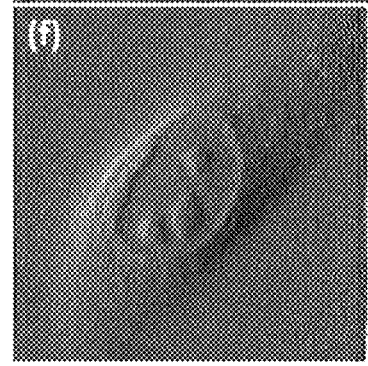
FIG. 9D    FIG. 9E    FIG. 9F FIG. 11A
FIG. 11B
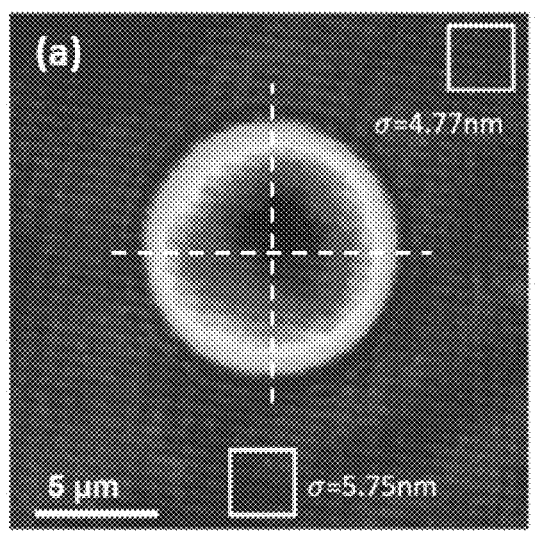 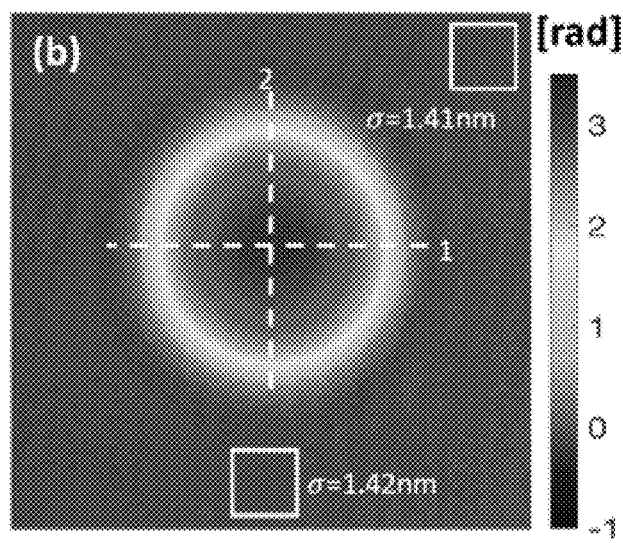
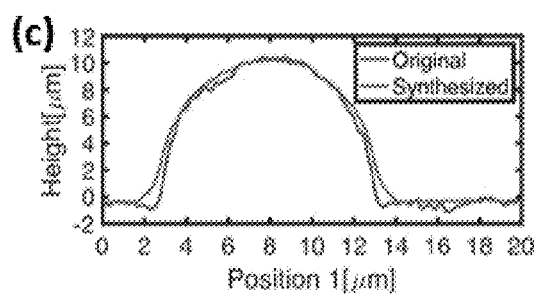 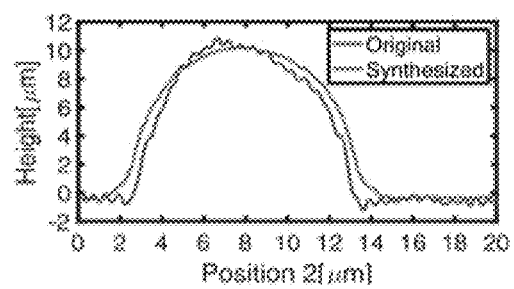
FIG. 11C FIG. 13A
FIG. 13B
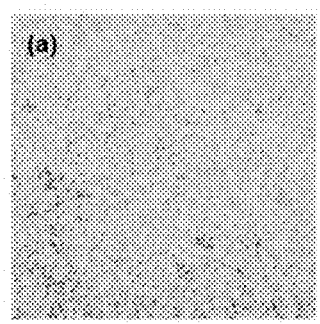
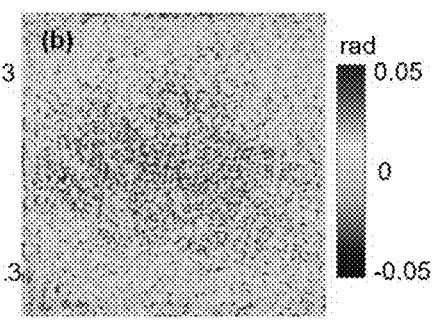
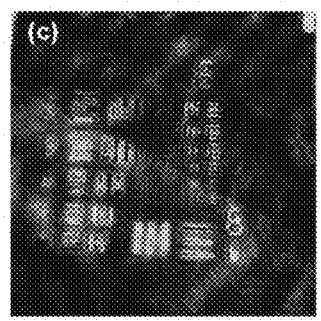
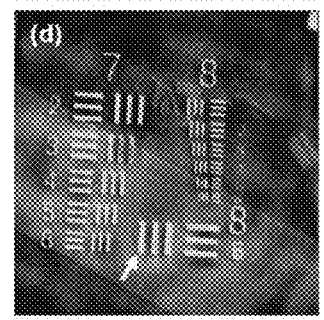
FIG. 13C
FIG. 13D
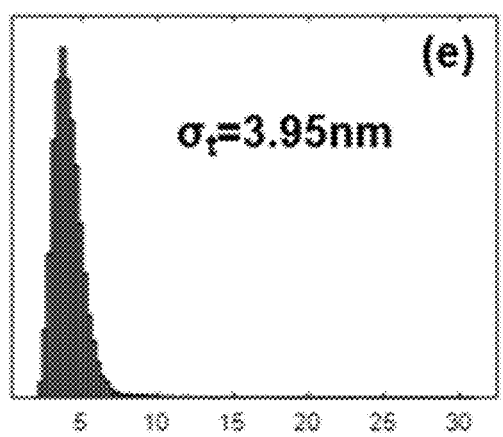
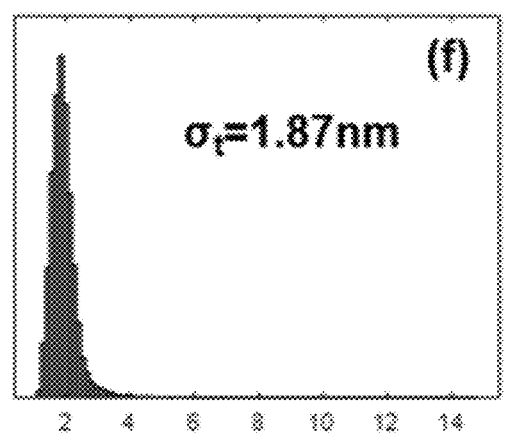
FIG. 13E
FIG. 13F FIG. 14A                FIG. 14B
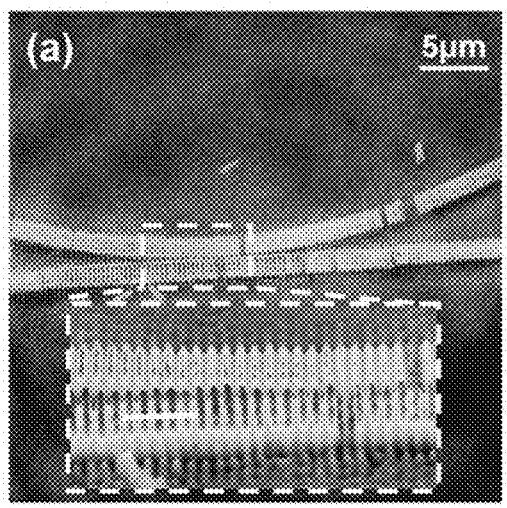
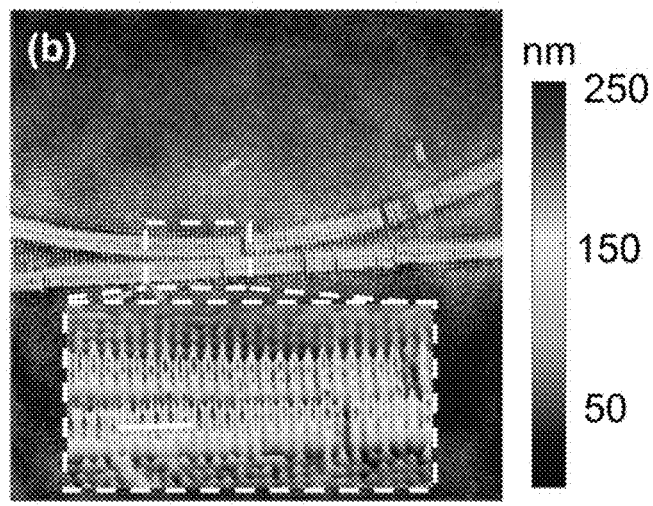
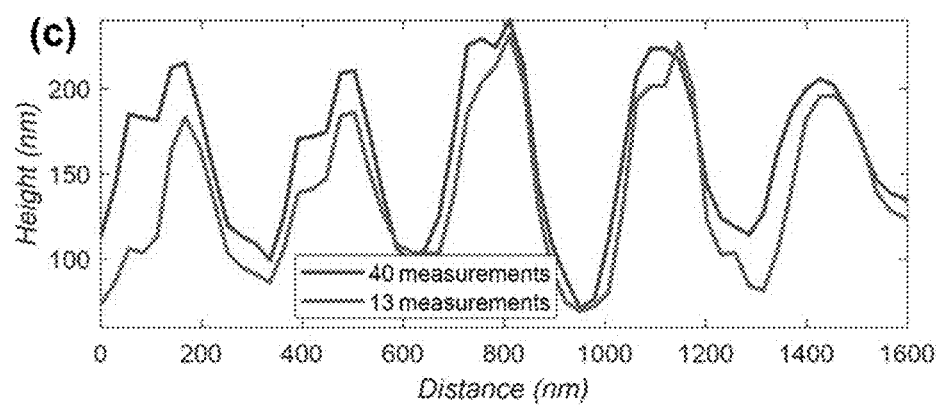
FIG. 14C

HIGH SPATIAL AND TEMPORAL RESOLUTION SYNTHETIC APERTURE PHASE MICROSCOPY (HISTR-SAPM)

CROSS-REFERENCE TO RELATED APPLICATION

This application claims the benefit of U.S. patent application Ser. No. 62/954,164, filed Dec. 27, 2019, which is hereby incorporated by reference in its entirety including any tables, figures, or drawings.

BACKGROUND OF THE INVENTION

High-speed and high-resolution imaging techniques have been long sought for material metrology and biological structure observation. Such examples include inspection of large area subwavelength structures and optical metasurfaces widely used in integrated photonics [1-2], monitoring fast semiconductor wet etching process [3] and microdroplet evaporation dynamics [4], observation of live cell dynamics in a large cell population [5-6], and tracking of high speed cell motions [7-8].

The conventional techniques, such as scanning electron microscopy (SEM) and atomic force microscopy (AFM), are impractical to image large sample areas due to their low throughput and low speeds. Moreover, when the structures are encapsulated in dielectric claddings, which are standard practices in fabricating photonic devices, SEM or AFM characterization becomes difficult as the claddings obscure the electron imaging contrast between the core and the claddings and inhibit the AFM probe from physically contacting the structure under test.

Another challenge for light microscopy is that many subwavelength structures and living cells are thin and transparent. Under the conventional bright-field microscopes, these structures cannot be well resolved due to their weak light absorptions. With chemical staining, fluorescence microscopy can be applied to image these structures. However, for certain live cell imaging and most material metrology applications, label-free or noninvasive imaging is favored for minimizing sample perturbation. Furthermore, fluorescence-based imaging techniques are usually slow, thereby limiting the use in high-speed imaging applications.

Phase or optical pathlength difference, as an intrinsic property of light that carries the object structural information, can be measured precisely with high contrast [9]. For reflective or homogenous and transparent samples, the measured phase maps can be transformed into corresponding surface height profiles with nanometer precision. Thanks to its non-invasive and label-free nature, quantitative phase microscopy (QPM) has been increasingly applied to semiconductor wafer detection, monitoring of semiconductors etching in material science [10-11], and modeling of cell growth, mechanics, and metabolism in biological imaging [12-13]. However, the lateral resolution of the wide-field coherent imaging techniques is limited to $\lambda$/NA due to the diffraction limit. Using multiple image recordings, several computational imaging methods including lensfree microscopy [14-15], Fourier ptychographic microscopy (FPM) [16-17] and synthetic aperture microscopy (SAM) [18-25] have been developed to improve the lateral resolution in coherent imaging. Among them, SAM stands out as a simple and robust technique. In SAM, the complex scattered fields, containing different object spatial spectrum sections obtained at different illumination angles, can be retrieved through digital holography and then synthesized to obtain an extended object spatial spectrum. Sample rotation [20], galvano-mirror-based beam scanning [18, 26], and illumination source shifting [27] have been implemented for realizing the SAM. To simultaneously capture multiple illumination angles, angle-multiplexed synthetic aperture techniques, such as these based on vertical-cavity surface-emitting laser (VCSEL) array [28], sub-pulses [29], or spatial light modulator (SLM) [30], and spatially multiplexed synthetic aperture technique [31] have also been proposed. Despite all the efforts, the smallest periodic structure resolved by SAM to date is 460 nm [30] and the highest imaging speed reported thus far is limited to less than 20 frames per second (fps).

BRIEF SUMMARY OF THE INVENTION

There continues to be a need in the art for improved designs and techniques for a system to break the resolution and speed limits to meet emerging application demands in material science and biology, including but not limited to profiling subwavelength structures and quantifying fast cellular dynamics.

Embodiments of the subject invention pertain to a high spatial and temporal resolution synthetic aperture phase microscopy (HISTR-SAPM) and methods for biological imaging and material metrology.

According to an embodiment of the subject invention, a system of high spatial and temporal resolution synthetic aperture phase microscopy (HISTR-SAPM) for imaging can comprise a fiber coupler receiving an input illumination beam, configured to provide a first illumination beam to propagate along a sample-illumination path and a second illumination beam to propagate along a reference-beam path; a first digital micromirror device (DMD) disposed in the sample-illumination path to receive the first illumination beam from the fiber coupler and configured to actively generate a plurality of sample illumination beams at different angles; a first lens disposed in the sample-illumination path to receive the sample illumination beams from the first DMD; a second DMD disposed in the sample-illumination path to receive the sample illumination beams from the first lens; a second lens and a third lens disposed in series in the sample-illumination path, receiving the sample illumination beams from the second DMD in sequence; a first scanning objective lens disposed in the sample-illumination path and at a first side adjacent to the sample to receive the sample illumination beams from the third lens and propagate the sample illumination beams through the sample for imaging; a second scanning objective lens disposed in the sample-illumination path and at a second side adjacent to the sample wherein the second side is opposite to the first side with respect to the sample, receiving the light passing through the sample; a fourth lens disposed in the sample-illumination path to receive sample illumination beam from the second scanning objective lens; a beam splitter (BS) disposed both in the sample-illumination path and in the reference-beam path to combine the sample illumination beam and the second illumination beam from the fiber coupler to form an interferogram at a final image plane. Moreover, the second DMD can be configured to filter undesirable diffraction orders of the sample illumination beams from the first DMD. The first DMD can be formed with a plurality of binary Lee holograms and the second DMD is formed with a plurality of spatial filtering maps corresponding to a plurality of binary Lee holograms of the first DMD, respectively. With such DMD configuration, multiple illumination angles can be generated simultaneously. Furthermore, the HISTR- SAPM system can further comprise a hardware trigger connection coupled to both the first and second DMDs and configured to synchronize pattern switching between the first DMD and the second DMD. The first DMD can be additionally configured such that sizes of the micromirrors confine maximum scanning angles to be around 1° immediately after a first DMD plane. The first DMD, the first lens, the second DMD, the second lens are configured to form a 4-f system; the third lens, the first scanning objective lens are configured to form another 4-f system. The two 4-f systems are configured to amplify a scan angle range of the sample illumination beams illuminating on the sample.

In another embodiment of the subject invention, a method of high spatial and temporal resolution synthetic aperture phase microscopy (HISTR-SAPM) for imaging is provided. The method can comprise splitting an input illumination beam, by a fiber coupler, into a first illumination beam to propagate along a sample-illumination path and a second illumination beam to propagate along a reference-beam path; transmitting the first illumination beam from the fiber coupler to a first digital micromirror device (DMD) disposed in the sample-illumination path, and configuring the first DMD to actively generate a plurality of sample illumination beams at different angles; transmitting the sample illumination beams from the first DMD to a first lens disposed in the sample-illumination path; transmitting the sample illumination beams from the first lens to a second DMD disposed in the sample-illumination path, and configuring the second DMD to filter undesirable diffraction orders of the sample illumination beams from the first DMD; synchronize pattern switching between the first DMD and the second DMD; transmitting the sample illumination beams from the second DMD to a second lens and a third lens in sequence, the second lens and the third lens being disposed in series in the sample-illumination path; transmitting the sample illumination beams from the third lens to a first scanning objective lens disposed in the sample-illumination path and at a first side adjacent to the sample; transmitting the sample illumination beams from the first scanning objective lens to propagate through the sample; wherein the first DMD, the first lens, the second DMD, the second lens are configured to form a 4-f system; the third lens, the first scanning objective lens are configured to form another 4-f system; and the two 4-f systems are configured to amplify a scan angle range of the sample illumination beams illuminating on the sample; transmitting the sample illumination beams from the sample to a second scanning objective lens disposed in the sample-illumination path and at a second side adjacent to the sample wherein the second side is opposite to the first side with respect to the sample; transmitting the sample illumination beams from the second scanning objective lens to a fourth lens; transmitting the sample illumination beams from the fourth lens to a beam splitter (BS) disposed in the sample-illumination path; transmitting the second illumination beam from the fiber coupler to the same BS also disposed in the reference-beam path; combining the sample illumination beams and reference beam at the BS to form an interferogram at a final image plane. Moreover, the first DMD can be formed with a plurality of binary Lee holograms and the second DMD can be formed with a plurality of spatial filtering maps corresponding to a plurality of binary Lee holograms of the first DMD, respectively. With such DMD configuration, multiple illumination angles can be generated simultaneously.

BRIEF DESCRIPTION OF THE DRAWINGS

FIGS. 1A-1C show spectrum analysis of different Lee holograms, wherein FIG. 1A shows the Lee holograms loaded on the first DMD, FIG. 1B shows images of a red blood cell (RBC) under the corresponding Lee hologram, and FIG. 1C shows spectrums of the recorded images, according to an embodiment of the subject invention.

FIGS. 4A-4E are images of a custom-made subwavelength grating structure, wherein FIG. 4A shows the original design of the structure; FIG. 4B shows a portion of the structure imaged by SEM; FIG. 4C shows a height map retrieved by the conventional QPM; FIG. 4D shows a height map reconstructed by the HISTR-SAPM system according to an embodiment of the subject invention; and FIG. 4E shows line profiles along the white lines in FIG. 4B and FIG. 4D.

FIGS. 6A-6C are HISTR-SAPM images of cell dry mass density measurements, wherein FIG. 6A is a phase map of a RBC under normal illumination, FIG. 6B is a HISTR-SAPM phase map of the same RBC, and FIG. 6C is a HISTR-SAPM image of the RBC showing dry mass density measurements, according to an embodiment of the subject invention.

FIGS. 7A-7C are RBC membrane height maps, wherein FIG. 7A is a raw interferogram from normal sample illumination, FIG. 7B is a height map of the RBC extracted from the normal illuminated raw interferogram, and FIG. 7C is a height map of the RBC reconstructed from 40 off-axis interferograms, according to an embodiment of the subject invention.

FIGS. 8A-8H are height maps of instantaneous RBC membrane fluctuation, wherein FIGS. 8A-8D are RBC height maps at different times, and FIGS. 8E-8H are displacement height maps by subtracting time-averaged height map, according to an embodiment of the subject invention.

FIGS. 9A-9F show observations of sub-cellular structures in unlabeled living cells, wherein FIG. 9A and FIG. 9D show the phase maps of a COS-7 cell and a HeLa cell under normal illumination, respectively; FIG. 9B and FIG. 9E show the phase maps reconstructed by the HISTR-SAPM system for the cells in FIG. 9A and FIG. 9D, respectively; and FIG. 9C and FIG. 9F show the phase gradient maps obtained based on FIG. 9B and FIG. 9E, respectively, according to an embodiment of the subject invention.

FIGS. 10A-10D show observations of living 3T3 cell dynamics after exposure to acetic acid, wherein FIGS. 10A-10C show the representative phase map frames reconstructed by the HISTR-SAPM system for the 3T3 cell during exposure to the acetic acid, and FIG. 10D show the respective time-lapse curves of phase evolution of nucleus, cytoplasm, and background over time, according to an embodiment of the subject invention.

FIGS. 11A-11C show experimental results of the validation of phase reconstruction accuracy of the HISTR-SAPM system, wherein FIG. 11A shows the phase map of a bead having a diameter of 10 μm under normal illumination, FIG. 11B shows the phase map reconstructed by the HISTR-SAPM system for the bead in FIG. 11A, and FIG. 11C shows the height profiles of the bead along line 1 and line 2 obtained from the phase map in FIG. 11A and FIG. 11B, respectively, according to an embodiment of the subject invention.

FIGS. 13A-13F show speckle noise reduction of the HISTR-SAPM system and methods, wherein FIGS. 13A and 13C show phase map of background and subwavelength structure reconstructed under normal illumination, respectively, and FIGS. 13B and 13D show phase map of the background and subwavelength structure after the synthetic aperture reconstruction, respectively, FIGS. 13E and 13F show temporal noise in background under normal illumination and after synthetic aperture reconstruction, respectively, according to an embodiment of the subject invention.

FIGS. 14A-14C show reconstructed height profiles, wherein FIG. 14A shows a reconstructed height profile with 40 scanning angles, FIG. 14B shows a reconstructed height profile with 13 scanning angles, FIG. 14C shows respective line profiles along the white line in FIGS. 14A and 14B, according to an embodiment of the subject invention.

DETAILED DISCLOSURE OF THE INVENTION

Working Principles

By illuminating the sample at an oblique angle, some of the higher spatial frequencies that are normally attenuated or missed during the detection process are shifted to lower spatial frequencies with much higher collection efficiency.

In the HISTR-SAPM system of the subject invention, there is no moving mechanical part involved for illumination angle control. Thus, the quality of the obtained images is not affected by environmental factors that consequently affect the spectrum synthesis and image reconstruction quality. Moreover, since off-axis interferograms are captured in the HISTR-SAPM system, the illumination angles can be self-calibrated by inspecting the Fourier transform.

Figure 1A:
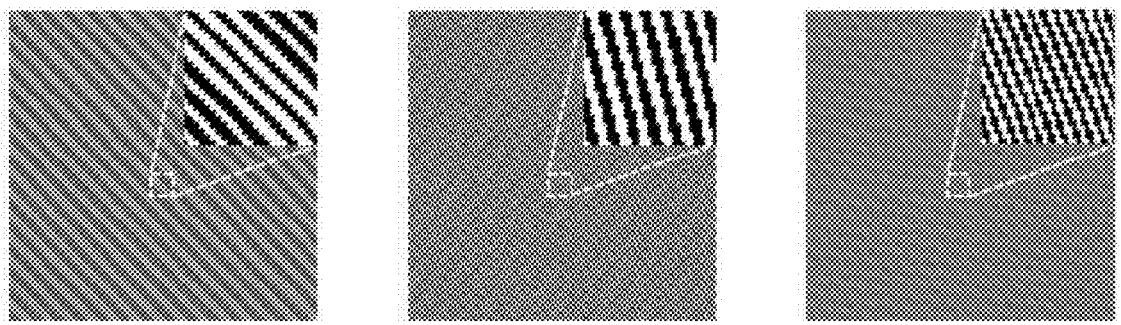
Figure 1B:
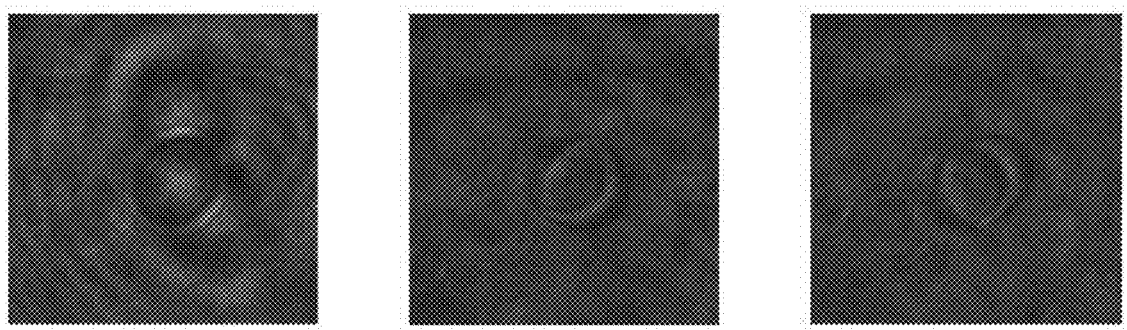
Figure 1C:
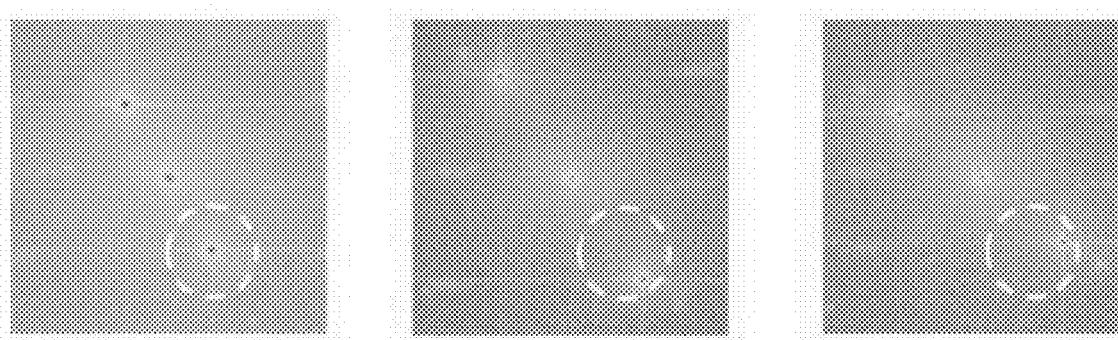

As shown in FIG. 1C, the white circle shows the passband of the imaging system and the displacement of the frequency peak indicates the frequency shifting ability.

To generate oblique illumination, the illumination can be decomposed into a phase ramp and a normal illumination. An amplitude hologram modulating the incident beam with desired phase o(x,y), could be written as Equation (1):

$$h(x,y) = \frac{1}{2} + \frac{1}{2}\cos[2\pi(ux+vy)+\phi(x,y)]$$

where u and v are carrier frequencies along spatial coordinates x and y, and where $\phi(x,y)$ is encoded phase distribution which is a two-dimensional (2D) linear function whose slop can be used to determine the tilting angle of the generated plane wave. Variables u and v generally take the same value so that the hologram is off-axis diagonally to provide a large enough separation to minimize crosstalk among orders. Then a threshold, for example 0.5 for maximizing the diffraction efficiency, is applied on h(x,y) to transfer it into a binary hologram. Three Lee holograms corresponding to different illumination angles and their magnified details are shown in FIG. 1A.

The phase ramp added may perfectly generate the desirable oblique illumination, if a higher bit-depth is used in the modulation. However, the binary nature of a first DMD inherently produces unwanted parasitic diffraction noise besides the desired one. The diffraction noise can be mostly eliminated by a physical annular aperture that is designed to only select the desired diffraction order [32]. Since the physical annular is difficult to align and cannot be modified, another approach to get rid of the diffraction noise orders using a time-multiplexing illumination scheme was proposed [33]. However, the 8-bit display mode does not allow for high speed pattern refresh.

In one embodiment, to achieve a more flexible filtering scheme without compromising the DMD refresh rate, a second DMD is added at the Fourier plane of the first DMD to make a tunable spatial filter.

The two DMDs are synchronized to dynamically select the desirable diffraction order generated by the first DMD. Each time when the first DMD displays a different Lee hologram, the corresponding filtering pixels on the second DMD are turned on. As a result, only the desired $1^{st}$ diffraction order is directed to the subsequent optical system. It interferes with the reference beam and forms an interferogram at the camera plane. FIG. 2B (images marked "(i)"-"(vi)") shows three representative interferograms and their corresponding spatial spectra, measured from a custom-made USAF resolution target sample. The first column (images marked "(i)" and "(iv)" of FIG. 2B) corresponds to the pair under normal sample illumination angle; the enlarged interferogram in the inset shows a clean fringe pattern. In the spatial frequency domain, the sample spatial spectrum, enclosed by the dotted circle region, is shifted by $k_{R\perp}$ due to fringe modulation. The perpendicular subscript indicates the wave vector component perpendicular to the optical axis. The radius of the dotted circle is $NA_{det}/\lambda$, where $NA_{det}$ is the numerical aperture (NA) of the second scanning objective lens 160. The next two columns (images marked "(ii)"/"(v)" of FIG. 2B and images marked "(iii)"/"(vi)" of FIG. 2B) are the interferogram-spatial spectrum pairs, corresponding to two different oblique sample illuminations. The changes of fringe orientation and period reflect the changes of the sample illumination angle, and $k_{S\perp}$ denotes the sample illumination beam wavevector as indicated in FIG. 2B (the image marked "(v)").

Galvano-mirrors can also be added for fast angle scanning when paired with a high-speed camera. However, when scanning at a high speed, mechanical vibrations could be generated, inducing angle-scanning instabilities. In addition, it is not easy to simultaneously focus two galvano-mirrors into the specimen plane for scanning angles in two orthogonal directions. Compared to galvano-mirrors, DMDs do not introduce any mechanical vibrations and can allow for a better focusing to the specimen plane. As DMDs provide more flexibilities in changing the display patterns, multiple scanning angles can be simultaneously realized by designing complex displayed patterns, for example, by overlapping several hologram patterns [34]. As a result, several folds of imaging speed improvement, which is difficult for galvano-mirror-based angle scanning method, can be obtained that. Therefore, DMDs generate better results than galvano-mirrors in the context of high-speed imaging.

The time lag between two DMDs' synchronization is set to be around, for example, 10 μs. Off-axis interferograms of an RBC under three different angles and their spectrum are presented in FIGS. 1B and 1C. The spectrum shows a clear background without unexpected frequency orders thanks to the proper dynamic filtering.

Figure 2B:
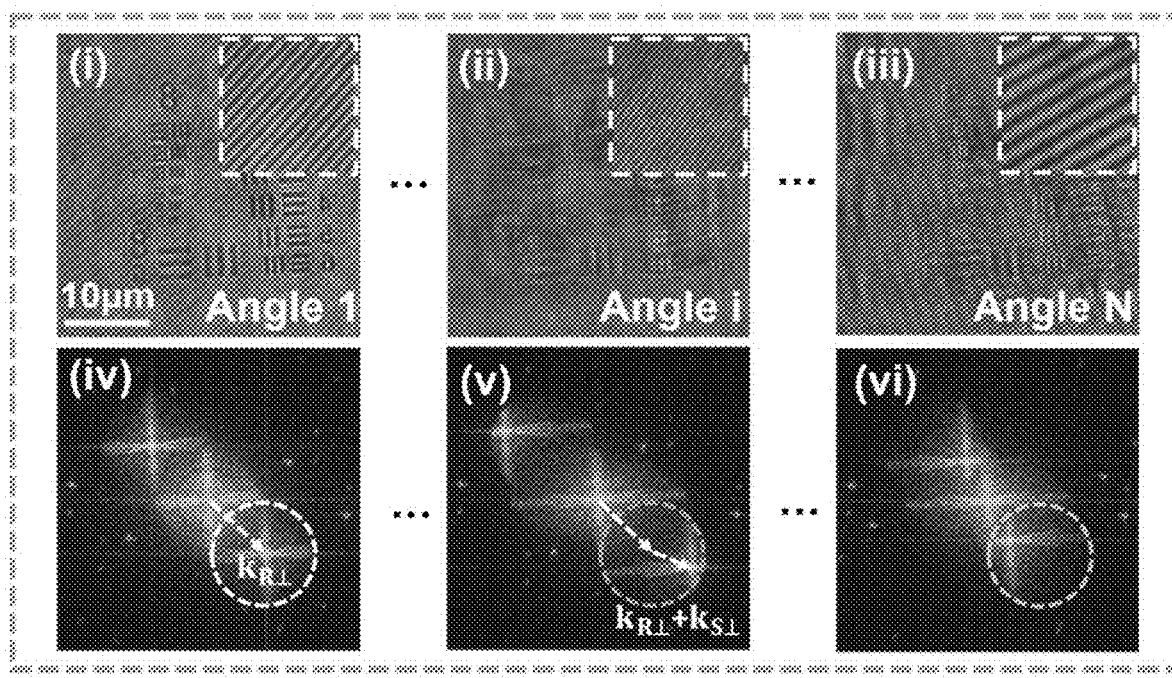
FIG. 2B includes images (i)-(iii) illustrating three raw interferograms taken under three different illumination angles, respectively, and images (iv)-(vi) illustrating three spatial spectra corresponding to the three raw interferograms, respectively, according to an embodiment of the subject invention.
Figure 3A:
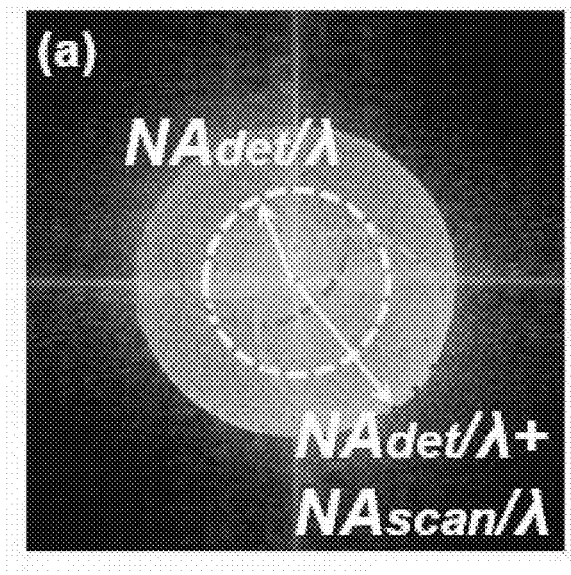
FIG. 3A illustrates spatial spectrum synthesis process of the HISTR-SAPM system, wherein the dotted circles correspond to frequency passbands in FIG. 2B, according to an embodiment of the subject invention.

Referring to FIG. 3A, the spatial spectrum synthesis process of the HISTR-SAPM system is illustrated. The dotted circles of FIG. 3A corresponding to the frequency passbands in FIG. 2B, according to an embodiment of the subject invention. In particular, the spatial spectrum of the USAF resolution target due to normal illumination is shown in the white dotted circle in FIG. 3A, while the dotted gold and orange circle regions show the detected spatial spectrum due to two representative oblique illumination angles, respectively.

Figure 3B:
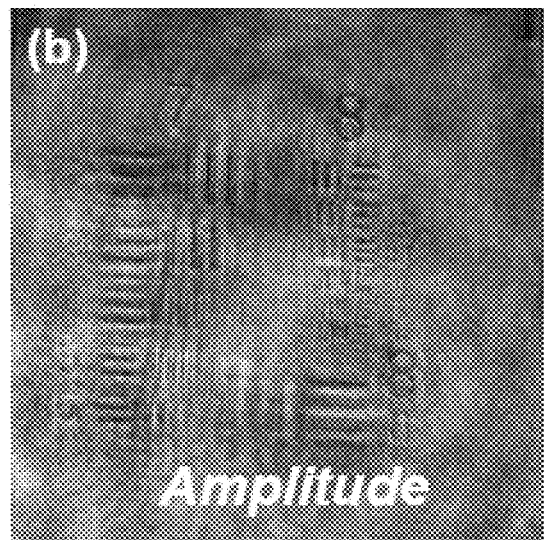
FIGS. 3B-3C illustrate high-resolution amplitude and phase reconstruction, respectively, according to an embodiment of the subject invention.
Figure 3C:
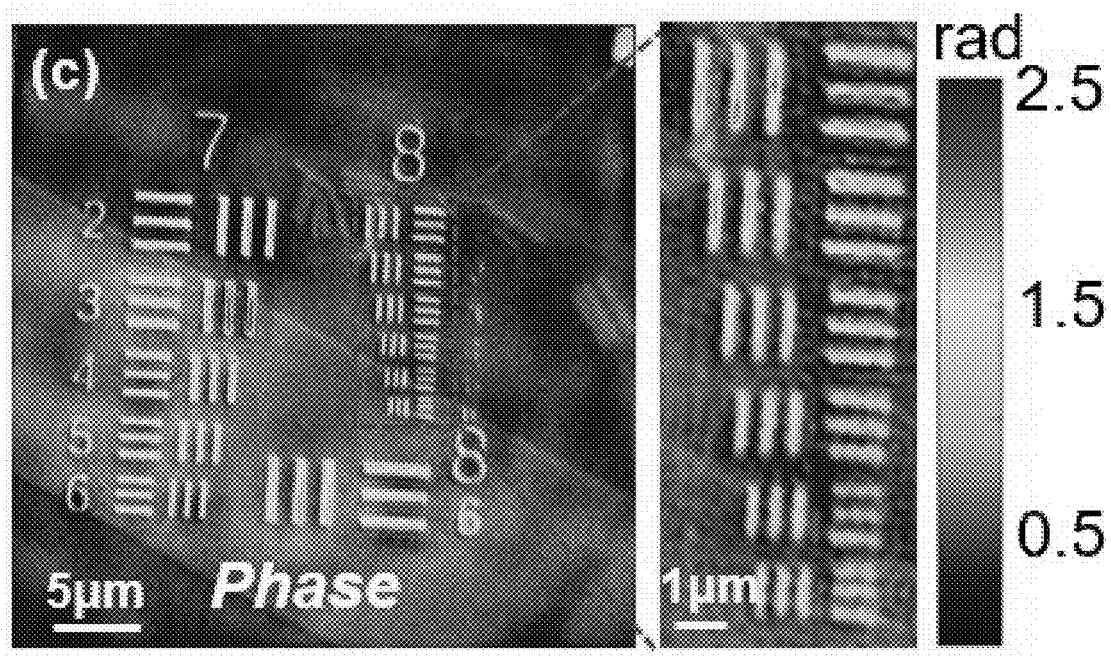

After aperture synthesis, an expanded sample spatial spectrum with a radius of $NA_{det}/\lambda + NA_{scan}/\lambda$ is achieved. $NA_{scan}$, determined by the maximum scan angle of the illumination beam, is a fraction of the NA of the first scanning objective lens 150. Considering the mismatches in the optical path length, a global constant frame-to-frame phase offset is calculated during the synthesis process. For the overlapping regions, its value is calculated as the average of all the spectra that co-occupy this region. The spatial variant phase errors induced by the possible motions of the sample are also taken into account. Finally, an inverse Fourier transform is performed over the synthesized spectrum to produce the complex field of the resolution target, from which a high-resolution amplitude map as shown in FIG. 3B and a phase map as shown in FIG. 3C is obtained.

In an embodiment of the subject invention, for each HISTR-SAPM image reconstruction, one interferogram is captured under normal illumination angle and 39 interferograms are captured with different oblique sample illuminations, equally spaced in the azimuthal direction, while a maximum elevation angle of approximately 40.5 degree is maintained.

Figure 12:
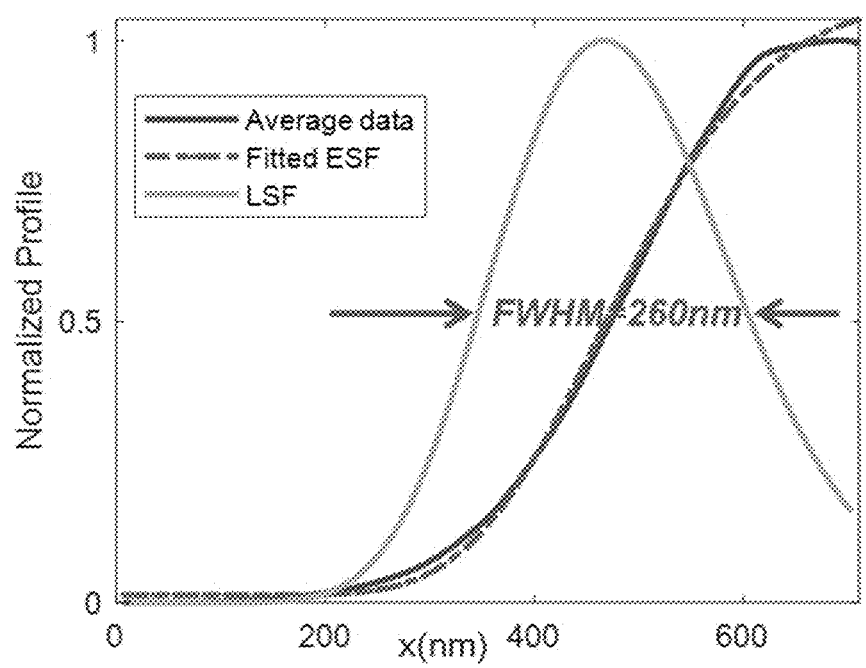
FIG. 12 shows plots for lateral resolution verification with the edge response, according to an embodiment of the subject invention.

Moreover, it is determined that NAdet/$\lambda$+NAscan/$\lambda$~1.76 NAdet/$\lambda$, from which a lateral resolution of 233 nm is obtained, which is almost twice smaller than the plane wave illumination coherent imaging limit. The lateral resolution, derived from the edge response of a measured line structure, also agrees with this value. The edge response is defined as a response of a system to a sharp straight discontinuity. As shown in FIG. 12, the average profile ((blue) line that has the highest profile value at x=600 nm) is first plotted along the edge of the largest line in Group 7 and Element 1 in the USAF resolution target which is indicated by the white arrow in FIG. 13D, and then is fitted with an error function to obtain the edge spread function (ESF) ((red) dotted line). Next, the lateral resolution is calculated as the full width at half maximum (FWHM) of the line spread function (LSF) which is the derivative of the ESF. The FWHM is determined to be 260 nm, which is in a good agreement with the theoretical value of 233 nm. It is noted that when different resolution criteria are applied, slightly different values may be obtained. Finally, an inverse Fourier transform is performed to produce the complex sample field, from which a high-resolution amplitude map of FIG. 3B and a phase map of FIG. 3C can be obtained.

Experimental Setup of the HISTR-SAPM System

Figure 2A:
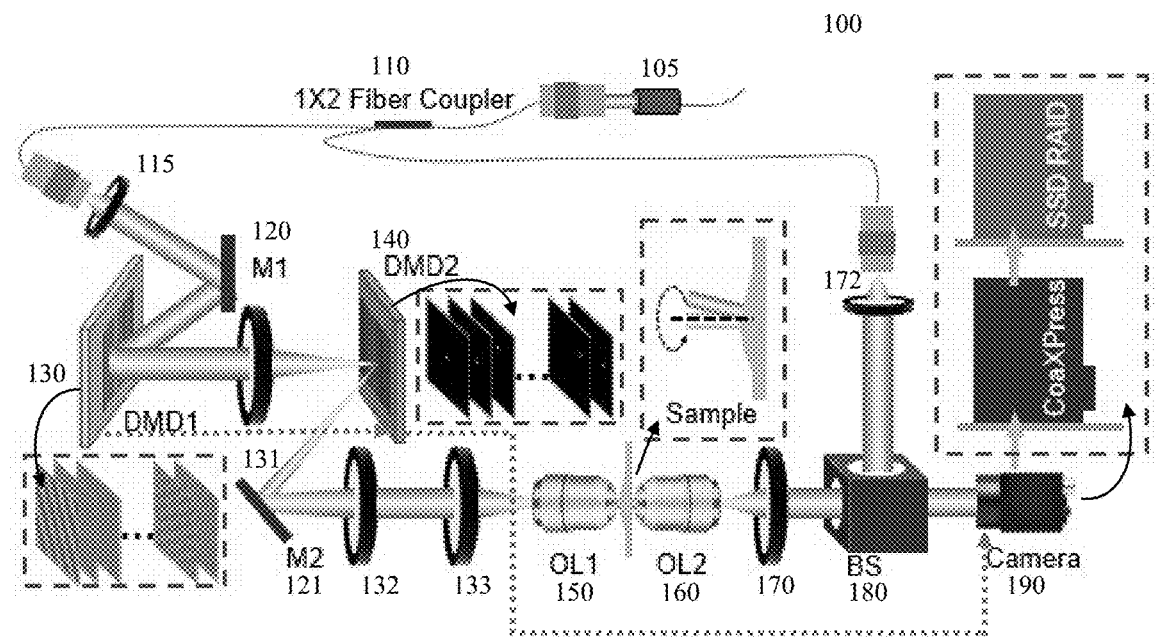
FIG. 2A is a schematic representation of experimental setup of the HISTR-SAPM system according to an embodiment of the subject invention.

As illustrated in FIG. 2A, two digital micromirror devices (DMDs) are incorporated into an illumination path for actively changing angles of a beam illuminating on a sample. The sample scattered complex fields, corresponding to different illumination angles, are generated and measured through an off-axis interferometry system and processed with a synthetic aperture image reconstruction method to produce a high-resolution phase image of the sample.

Referring to FIG. 2A, the HISTR-SAPM system 100 for imaging the sample such as living cells or fabricated grating structures with fast speeds and high resolutions, comprises an illuminating source 105 for generating illumination beam, a fiber coupler 110. Upon receiving the input illumination beam, the fiber coupler 110 can be configured to provide a first illumination beam outputting from a first output end 115 to propagate along a sample-illumination path and a second illumination beam outputting from a second output end 172 to propagate along a reference-beam path.

In the sample-illumination path, the HISTR-SAPM system 100 comprises a first mirror 120 to receive and reflect the illumination beam outputting from a first output end 115; a first digital micromirror device (DMD) 130 to receive the first illumination beam from the first mirror 120; and the first mirror 120 disposed between the fiber coupler 110 and the first digital micromirror device (DMD) 130. The first illumination beam from the fiber coupler 110 transmits through the first output end 115 and is then reflected by the first mirror 120 to reach the first DMD 130. The first DMD 130 is configured to receive the first illumination beam and actively generate a plurality of sample illumination beams propagating at different angles. The plurality of sample illumination beams generated by the first DMD 130 is further transmitted through a first lens 131 to reach a second DMD 140 disposed in the sample-illumination path. The second DMD 140 can be placed in the Fourier plane of the first DMD 130 and configured to be a tunable spatial filter to filter undesirable diffraction orders of the sample illumination beams received.

Moreover, the first DMD 130 and the second DMD 140 can be synchronized to dynamically select the first diffraction order and block all the others. Each time when the first DMD 130 displays a different Lee hologram, the corresponding filtering pixels on the second DMD 140 are turned on. As a result, only the desirable first diffraction order is directed to the subsequent optical devices of the sample-illumination path. Because the time lag between the first DMD 130 and the second DMD 140 is minimal, a high pattern refresh rate can be maintained, enabling high speed angle scanning.

Referring to FIG. 2A again, in the sample-illumination path, the HISTR-SAPM system 100 can further comprise a first scanning objective lens 150 disposed at a first side adjacent to the sample to receive the sample illumination beams from the second DMD 140. A second mirror 121, a second lens 132 and a third lens 133 can be additionally disposed in series between the second DMD 140 and the first scanning objective lens 150. A second scanning objective lens 160 and a fourth lens 170 can be disposed in series after the sample. Thus, the sample illumination beams from the second DMD 140 is reflected by the second mirror 121 and is then transmitted through the second lens 132 and sequentially the third lens 133 to reach the first scanning objective lens 150 which illuminates the sample illumination beams onto the sample. Moreover, the second scanning objective lens 160 is disposed at a second side adjacent to the sample that is opposite to the first side. The second scanning objective lens 160 receives the sample illumination beams from the sample and transmits the sample illumination beams to the fourth lens 170.

On the other hand, in the reference-beam path of FIG. 3A, the HISTR-SAPM system 100 comprises a beam splitter (BS) 180 receiving the second illumination beam from the fiber coupler 110 through the second output end 172. The BS 180 is also disposed in the sample-illumination path. As a result, the sample illumination beam and the reference beam are combined by the BS 180 and form an interferogram at a final image plane, which is received by a camera 190.

In one embodiment, a trigger output port of the first DMD 130 is connected to a trigger input port of the second DMD 140, and a trigger output port of the second DMD 140 is connected to a trigger input port of the camera 190. When the Lee hologram patterns on the first DMD 130 are switched, the corresponding filter patterns on the second DMD 140 is sequentially switched and then the camera 190 is triggered to capture the interferograms for imaging.

In another embodiment, an alternative trigger connection may employ an external function generator with a rectangular pulse train as the output, whose repetition rates are set to be the same as the camera imaging rate, to simultaneously trigger the first DMD 130, the second DMD 140, and the camera 190. To avoid delays among the first DMD 130, the second DMD 140, and the camera 190, a digital delay generator can be implemented.

It is noted that to fully utilize the aperture of the objective lens, the first DMD 130, the first lens 131, the second DMD 140, the second lens 132 of the sample-illumination path are configured to form a 4-f system; the third lens 133 and the first scanning objective lens 150 are configured to form another 4-f system to amplify the scan angle range of the sample illumination beams that illuminates on the sample.

In one embodiment, the first DMD 130 is configured such that sizes of the micromirrors confine maximum scanning angles to be around 1° immediately after the first DMD plane.

In one embodiment, the HISTR-SAPM system 100 further comprises a hardware trigger connection coupled to both the first and second DMDs 130/140 and configured to synchronize pattern switching between the first DMD and the second DMD 130/140 at a frequency on a scale of kHz.

In one embodiment, the fiber coupler 110 of the HISTR-SAPM system 100 has a 1×2 single-mode and receives a laser beam having a suitable wavelength, for example, a wavelength of any one of 405 nm, 488 nm, 532 nm, 633 nm, 800 nm, 1 μm, 1.3 μm, and 1.5 μm, as the input illumination beam from the illumination source 105. The laser beam can be split into two arms by the 1×2 single-mode fiber coupler with one output arm for the sample-illumination path and the other for the reference-beam path.

In one embodiment, the first DMD 130 is DLP Light Crafter 9000 and the second DMD is a DLP Light Crafter 3000 manufactured by Texas Instruments Inc., In one embodiment, the first scanning objective lens 150 is a Zeiss lens having a magnification of 40×, a numerical aperture of 1.3 and has an oil immersion. In one embodiment, the first scanning objective lens 150 and the second scanning objective lens 160 have identical specifications.

In one embodiment, the fourth lens 170 of the sample-illumination path is a tube lens.

Measurement Results

Figure 4A:
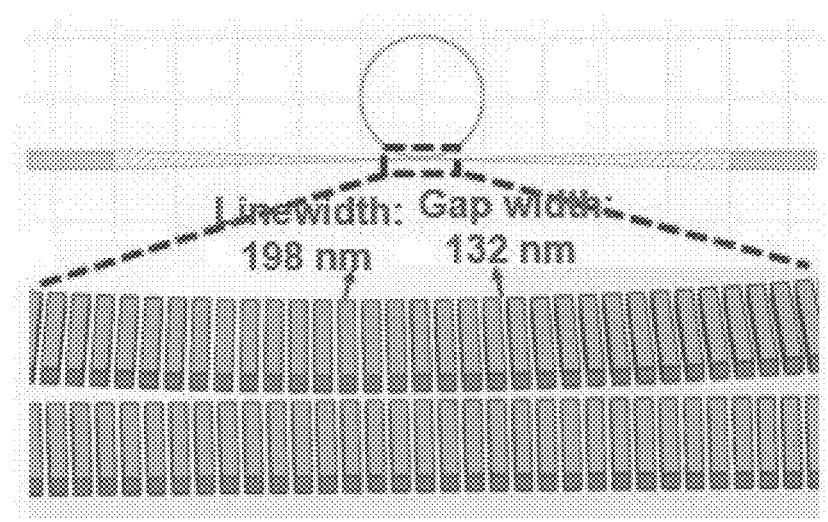
Figure 4B:
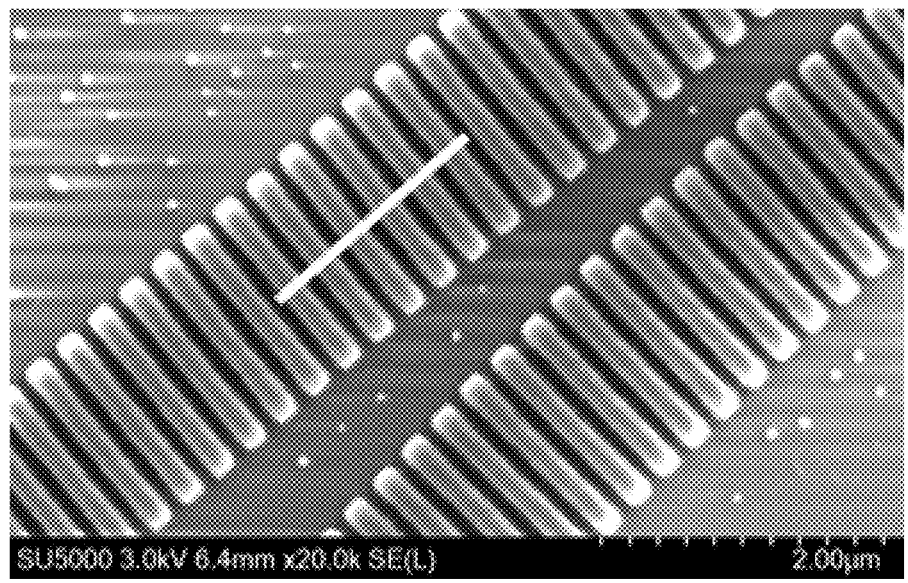
Figure 4C:
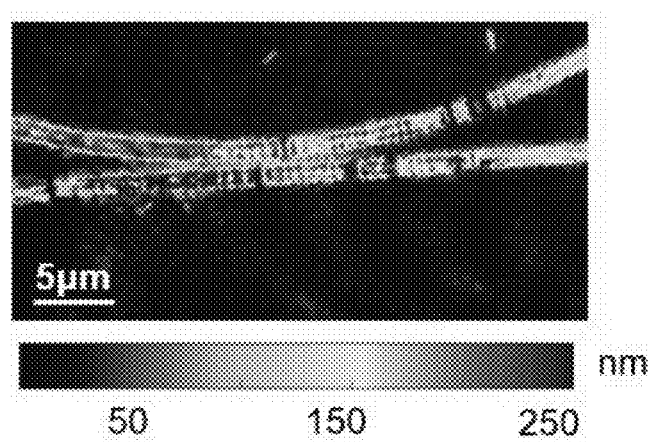
Figure 4D:
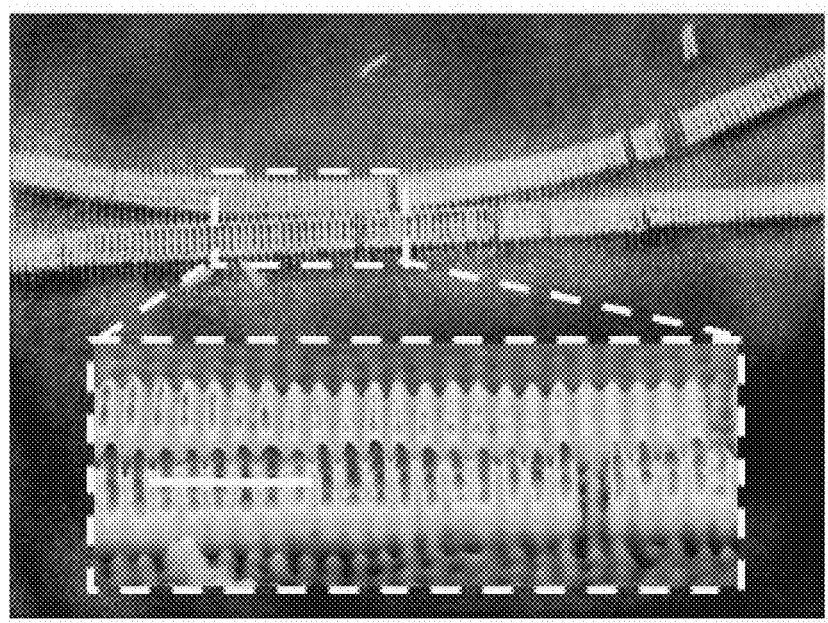
Figure 4E:
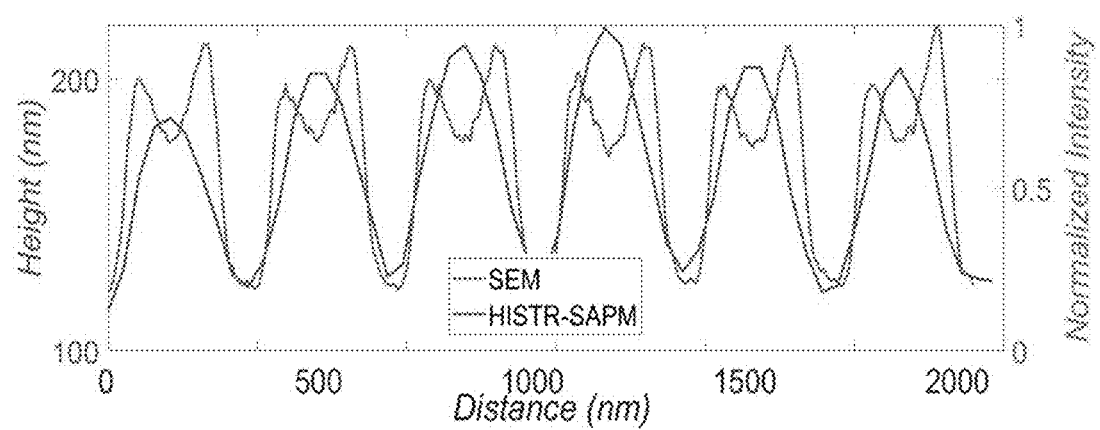

The HISTR-SAPM system 100 is useful in characterizing sub-wavelength grating structures commonly adopted in the integrated photonic devices. FIGS. 4A-4E are images of a custom-made subwavelength grating structure. In particular, FIG. 4A shows original design of the structure, FIG. 4B shows a portion of the periodical structure imaged by SEM, FIG. 4C shows a height map retrieved by the conventional QPM, FIG. 4D shows a height map reconstructed by the HISTR-SAPM system according to an embodiment of the subject invention, and FIG. 4E shows line profiles along the white lines in FIG. 4B and FIG. 4D. The gating structure of FIG. 4A is determined to have a period of 330 nm with a linewidth and gap width of 198 nm and 132 nm, respectively.

As the structure features are much smaller than the coherent imaging diffraction limit, it not possible for a conventional QPM system to resolve the features and correctly retrieve the height map. For example, FIG. 4C shows height profile measurements of the structure obtained by the conventional QPM, where the structures are poorly resolved. In contrast, the height map reconstructed by the HISTR-SAPM system in FIG. 4D provides a clear view of the grating structure. An enlarged side view shows each individual grating structure and their height profiles.

Figure 5A:
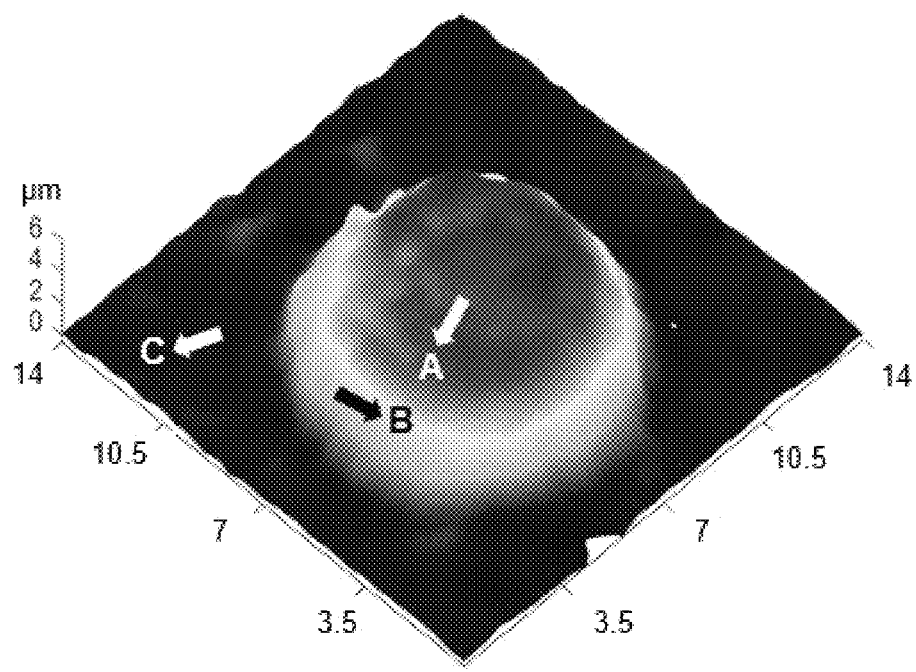
FIGS. 5A-5B are the HISTR-SAPM image of a RBC membrane and corresponding height fluctuation plot, respectively, wherein letter A indicates a cell center region, letter B indicate a cell outer region, and letter C indicates a background region, according to an embodiment of the subject invention.
Figure 5B:
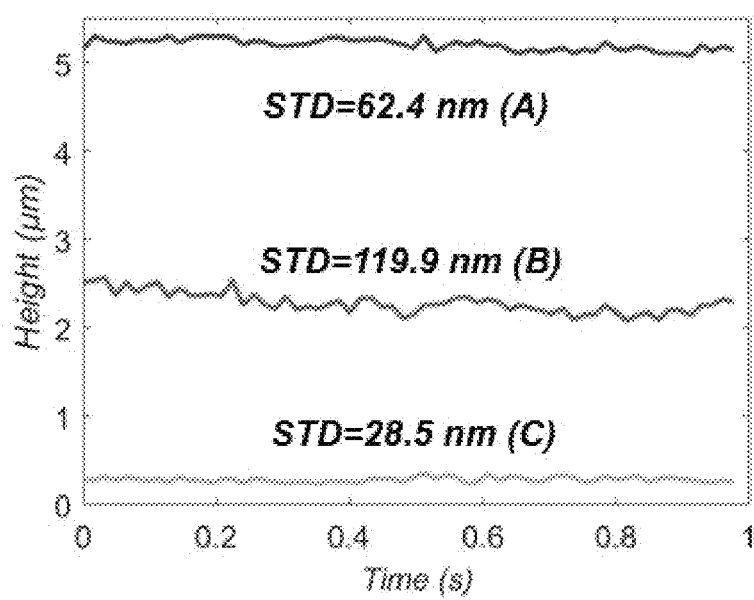

In FIG. 4E, the height profile (blue curve) is plotted for the structures across the white solid line in FIG. 4D. An SEM intensity profile of the same sample region is also plotted alongside (orange curve) to show the excellent agreement on the lateral dimension measurement. It is noted that as the SEM image does not provide the height profile, the dimples across the line structures are not associated with height variations. The sample phase map is reconstructed with only 13 sample scanning angles (for example, 13 ms total image acquisition time when operating the camera at 1,000 fps) and the retrieved height map retains most of the details. Referring to FIGS. 5A and 5B, the HISTR-SAPM images of red blood cell (RBC) membrane height fluctuation are shown, wherein the letter A indicates a cell center region, the letter B indicate a cell outer region, and the letter C indicates a background region.

Quantifying live cell dynamics is important to understand many physiological processes at single cell level. For example, red blood cell (RBC) membrane height fluctuation maps can be used to derive RBC stiffness parameters for assessing their viability. To demonstrate the high-speed imaging capability of the HISTR-SAPM system, membrane dynamics of human RBCs are quantified.

In one embodiment, human RBCs and Hela cells are collected and diluted in an Alsever's solution (for example, with RI=1.337). The RBC sample is not centrifuged and washed so it contains whole blood cells. A drop of the RBC sample is sandwiched between two No. 1 glass coverslips before the measurements.

A spherocyte, as shown in FIG. 5A is imaged by recording 1,000 consecutive interferograms at a frame rate of 1,000 fps. Only 16 interferograms corresponding to 16 scanning angles are used for each synthetic aperture phase reconstruction, therefore the effective imaging frame rate of the membrane fluctuations is 63 fps. Time lapse of the height fluctuation for 3 selected spots are plotted: the cell center region (A), cell outer region (B), and background (C). From the height fluctuation standard deviation (STD) values, it is determined that the outer region (B) experiences more fluctuations than the center region (119.9 nm vs. 62.4 nm; the values are also much higher than the background STD of 28.5 nm), which is consistent with previous observations. The demonstration suggests that the HISTR-SAPM system and methods can be applied to observe fast nanoscale morphological changes in biological samples. For conventional laser-illumination based phase imaging using a high NA objective, the diffraction effects usually lead to significant speckle noise and thus inaccurate phase values. As a result, the RBC fluctuation measurements under the high NA imaging may not be accurate. With the HISTR-SAPM system, the diffraction effects are already taken into account in the image reconstruction process, thus the laser speckle noise can be reduced by the angle-synthesizing process, as demonstrated in the sub-wavelength grating structure imaging example and the precise mapping of the RBC morphology.

Figures 6A, 6B:
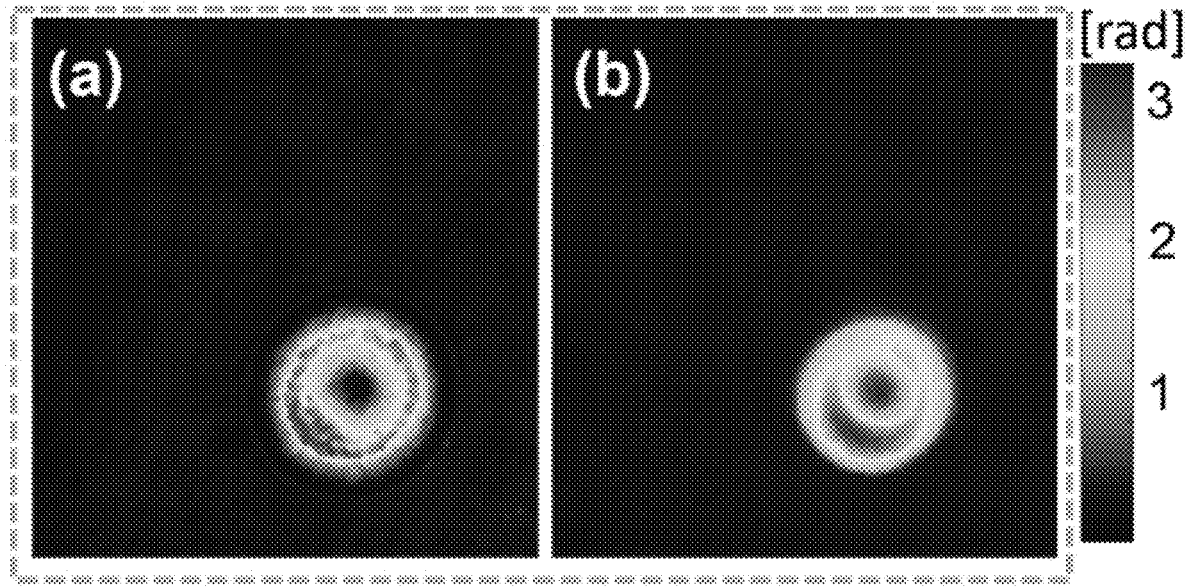
Figure 6C:
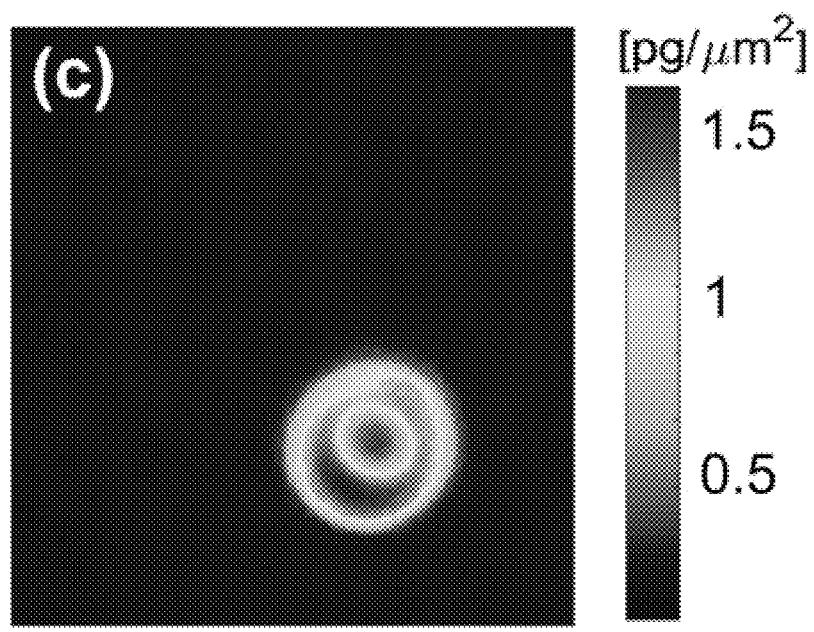

FIGS. 6A-6C show HISTR-SAPM images of cell dry mass density measurements. In particular, FIG. 6A is a HISTR-SAPM phase map of a RBC, FIG. 6B is a HISTR-SAPM phase map of the same RBC free of speckle noise, and FIG. 6C is a HISTR-SAPM image of the RBC showing dry mass density measurements.

Referring to FIG. 6A, the phase map of the RBC (discocyte) is illustrated. The image is retrieved using the conventional standard QPM under NA=1.3, and obvious speckle noise is observed. In contrast, the phase map retrieved from the HISTR-SAPM system in FIG. 6B is free of speckle noise. Converting the RBC phase map to the height map using an index contrast of 0.08 gives height values of 2-2.5 μm, which is consistent with the literature reports, thereby further confirming the accuracy of the phase measurements by the HISTR-SAPM system and methods.

A more accurate phase map leads to a more accurate dry mass density map, which has been widely used to study cell cycle and growth. In FIG. 6C, the dry mass density distributions of the RBC are shown. Besides cell membrane fluctuations and dry mass density, other biologically-relevant parameters including, but not limited to, cell projected area, and relative cell volume can also be obtained from the phase profiles.

Figure 7A:
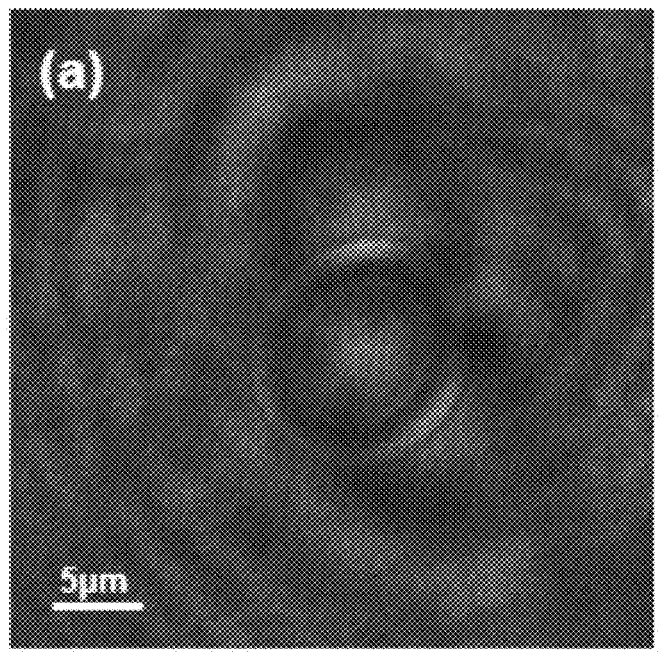
Figure 7B:
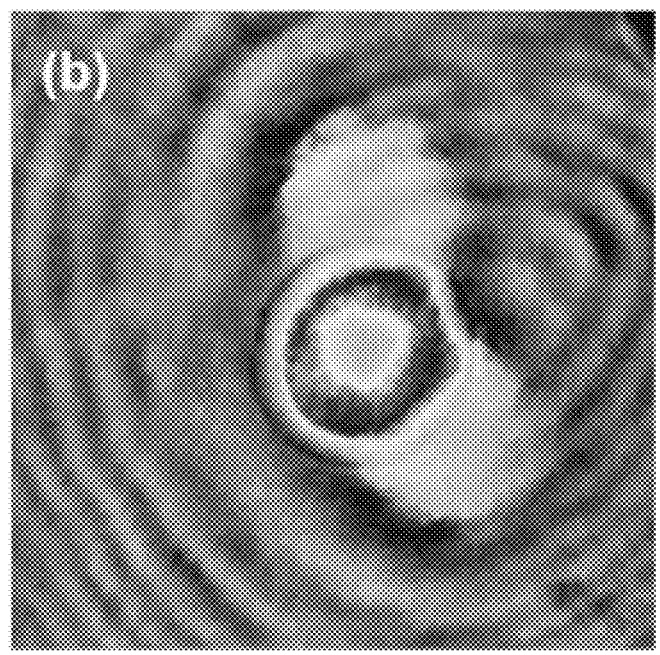
Figure 7C:
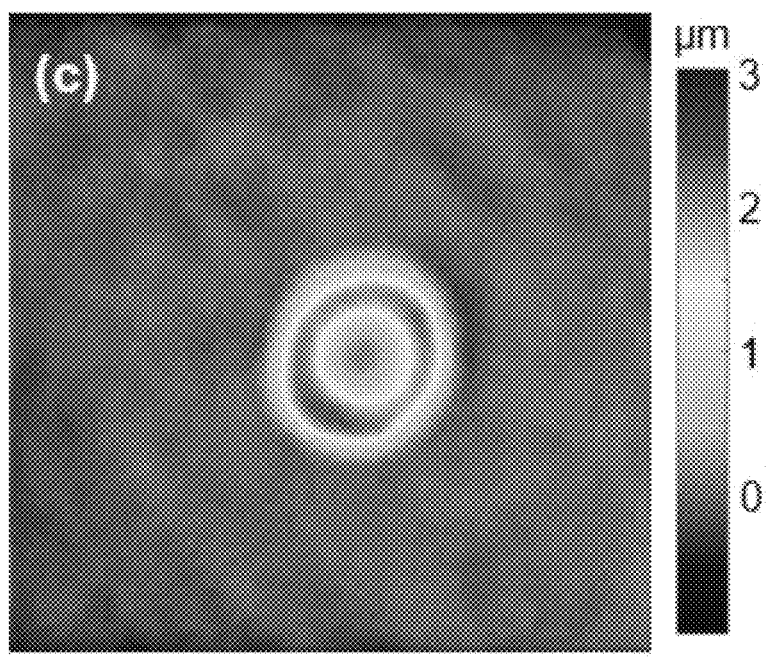
Figures 8A, 8B, 8C, 8D, 8E, 8F, 8G, 8H:
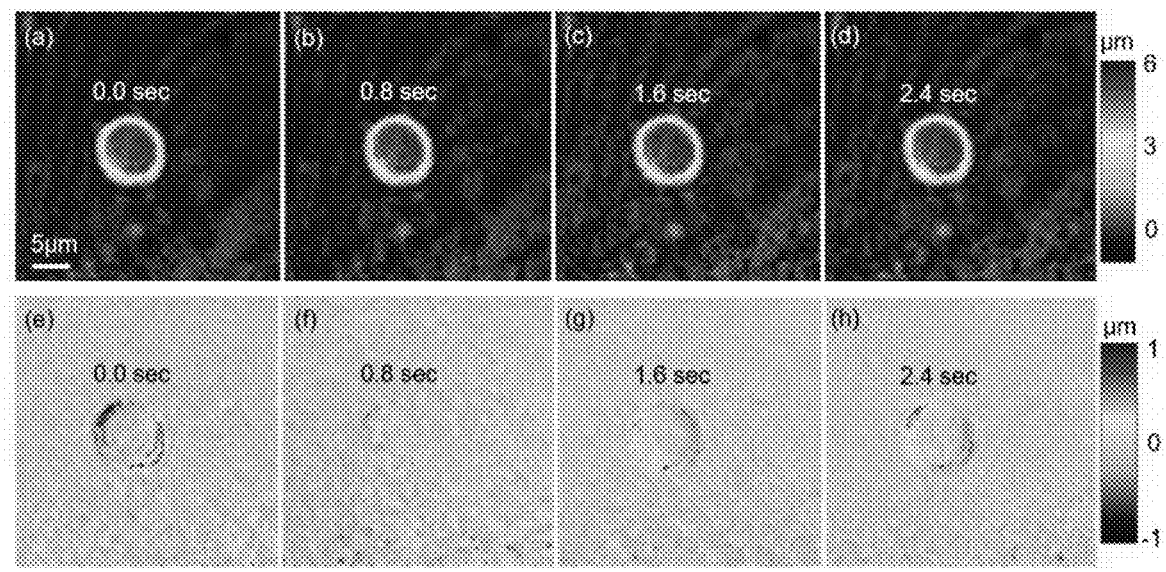

Referring to FIGS. 7A-7C, a live RBC suspended in a phosphate-buffered saline (PBS, BioWhittaker) solution is imaged. RBCs mostly exhibit a biconcave disk shape with diameters in a range of approximately 6.2-8.2 μm and a thickness in a range of about 2-2.5 μm at the edge and a thickness in a range of about 0.8-1 μm in the center.

A raw off-axis interferogram with the RBC at the center of the field of view is presented in FIG. 7A. The background is full of irregular patterns due to speckles and inhomogeneous of the solution. To obtain the height map of the RBC, the refractive index of the cell and solution are assumed to be 1.40 and 1.33, respectively. In the conventional QPI techniques, the height map is extracted from only the interferogram under normal sample illumination and the irregular background pattern can not be removed from the height map, leading to a distorted result in FIG. 7B. The phase map with synthetic aperture is reconstructed by the HISTR-SAPM system of the subject invention using 40 continuously recorded off-axis interferograms. The result of the HISTR-SAPM system in FIG. 7C shows a much more uniform background with the measured height closer to the parameters of a typical RBC.

When suspended in the solution, the thin plasma membrane of the RBC will dynamically deform, leading to changes in cell morphology. Quantifying these morphological changes could be used to extract RBC mechanical parameters and study RBC metabolisms and diseases. A time stack of an RBC is captured at 1000 fps to observe this phenomenon.

In FIGS. 8A-8H, four frames are selected from the reconstructed video of an echinocyte instead of normal biconcave disk shape cells. In particular, FIGS. 8A-8D are the height map and FIGS. 8E-8H are corresponding displacement height maps by subtracting the time-averaged height maps from FIG. 8A-8D. The membrane fluctuations are mostly localized at the outer region, with magnitudes around several nanometers and being varied throughout time.

With the improved spatial resolution of two times and the high imaging contrast, more complex cells can be imaged. The phase maps of a COS-7 cell and a HeLa cell under normal illumination are shown in FIGS. 9A and 9D, respectively; and the phase maps of a COS-7 cell and a HeLa cell after the HISTR-SAPM reconstruction are shown in FIGS. 9B and 9E, respectively. The noise and speckle in the images under normal illumination are mostly removed after reconstruction, making the cell boundaries and sub-cellular structures more visible (for example, small organelles in the cytoplasm of the COS-7 cell and nucleus envelope and nucleoli of the HeLa cell). With such a high dynamic range achieved in the synthetic phase map, the phase gradient maps are calculated based on FIG. 9B and FIG. 9E, and the results are shown in FIGS. 9C and 9F, respectively. Moreover, the interferograms can be captured with a faster camera (for example, Fastcam SA-X2, Photron) at a frame rate of, for example, 5,000 fps, while the second DMD 140 is configured to be a DLP Light Crafter 9000 model to match the speeds of the camera. For each reconstruction, 49 consecutive interferograms corresponding to 49 scanning angles are obtained at an imaging speed of 100 fps. It is noted that with reduced number of angles, the imaging speed can be more than doubled to achieve a temporal resolution smaller than 5 ms.

Figure 10A:
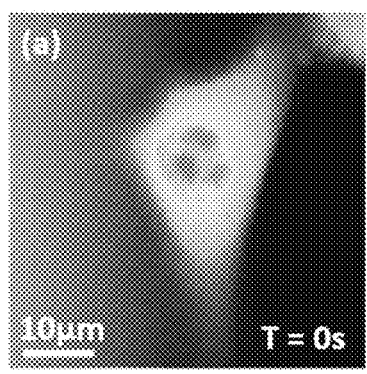
Figure 10B:
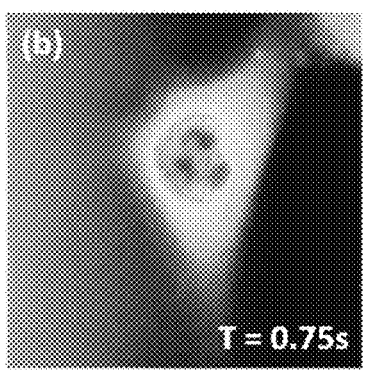
Figure 10C:
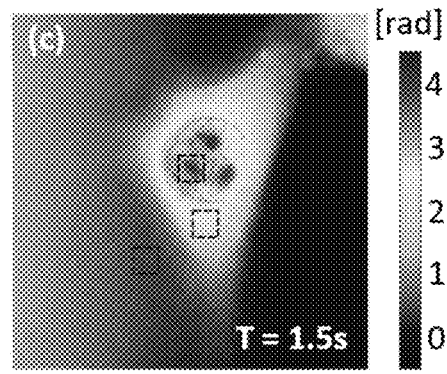
Figure 10D:
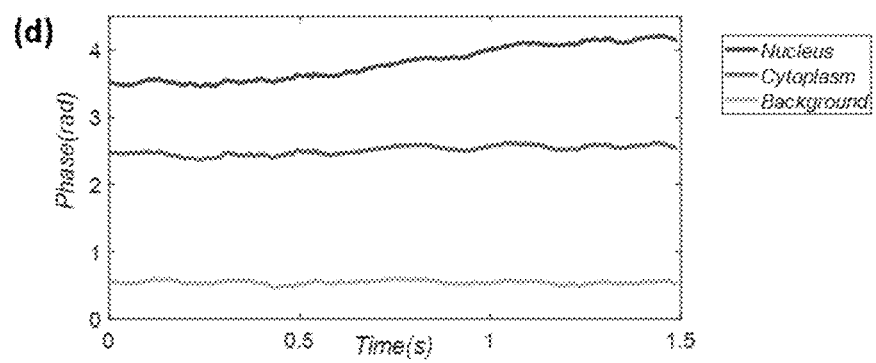

In one embodiment, to demonstrate the capability of imaging fast dynamics of sub-cellular structures, 3T3 cells are exposed to a drop of 0.5% acetic acid solution and immediately recorded a time-lapse of 7,500 interferograms for a total of 1.50 seconds while the illumination angle is scanned. Previous research has shown that exposure to acetic acid can immediately lead to an increase in the refractive index inhomogeneity in the cell nuclear region [35]. After all the interferograms are processed, a time lapse of synthetic phase maps with a temporal resolution of 10 ms is obtained. Immediately following the exposure to acetic acid, there is a dramatic phase value increase in the cell nuclear region and the nuclear membrane becomes more prominent, while the cytoplasm region stays almost the same. Three representative frames at t=0 s, 0.75 s, and 1.5 s are shown in FIGS. 10A-10C. Further, the time-lapse curves of average phase variation in three representative regions indicated by black boxes in FIG. 10C are plotted in FIG. 10D, from which an obvious increase in phase value in the nucleus region over time can be observed.

With a high-speed camera and a data transfer interface (for example CoaXPress data transfer interface), an image acquisition speed greater than 5 kHz is realized. The versatility of the HISTR-SAPM system is demonstrated by the high-speed and high-resolution imaging of subwavelength photonics structures, red blood cells, and more complex cells such as 3T3 cells, COS-7 cells, and HeLa cells, as well as their sub-cellular dynamics. It is demonstrated that the DMD-based HISTR-SAPM system has increased the coherent imaging lateral resolution by a factor of 2 while achieving millisecond level temporal resolution. With the HISTR-SAPM system, surface profiling of material structures that have lateral features as small as 132 nm, quantified RBC membrane fluctuations in millisecond timescale, and observed nucleated cell structural structures and their dynamic changes during exposure to chemicals are achieved. Considering the flexible patterning capability of the DMD for generating multiple illumination angles simultaneously and the availability of higher speed cameras (e.g., >10,000 fps), the HISTR-SAPM can be further developed to achieve even 10 times higher imaging speed.

The HISTR-SAPM system can also be configured to map the 3D refractive index distributions of cells by implementing a 3D image reconstruction method. The removal of speckle enables the resolving power comparable with the conventional white-light diffraction tomography. When the numerical aperture (NA) of the second scanning objective lens is decreased, the HISTR-SAPM system can potentially achieve a higher imaging speed comparable with the conventional Fourier Ptychographic microscopy.

System Performance

The accuracy of the phase reconstruction is demonstrated by imaging 10 µm polystyrene beads. FIGS. 11A-11C show experimental results of the validation of phase reconstruction accuracy of the HISTR-SAPM system, wherein FIG. 11A shows the phase map of a bead having a diameter of 10 µm under normal illumination, FIG. 11B shows the phase map reconstructed by the HISTR-SAPM system for the bead in FIG. 11A, and FIG. 11C shows the height profiles of the bead along line 1 and line 2 obtained from the phase map in FIG. 11A and FIG. 11B, respectively. The height values in both cases match well with the theoretical value, while the height profiles after aperture synthesis are smoother and more symmetric due to the reduction of the laser speckle. There is also a reduction in the background noise level in the areas indicated by the white boxes.

FIGS. 13A-13F show the method of speckle noise reduction quantification, wherein FIG. 13A and FIG. 13C show phase maps of background and subwavelength structure reconstructed under normal illumination, respectively; FIG. 13B and FIG. 13D show phase maps of background and subwavelength structure after synthetic aperture reconstruction, respectively; FIGS. 13E and 13F show temporal noise in background under normal illumination and after synthetic aperture reconstruction, respectively.

The speckle noise effect can be effectively reduced by a HISTR-SAPM system of embodiments of the subject invention. It is noted that speckle noise, arising from multi-reflection and diffraction between surfaces in the optical paths and in the sample, is one of the main concerns when coherent laser sources are used for quantitative phase imaging. Thus, conventional QPM methods using laser sources significantly suffer from irregular and unstable speckle patterns. In the conventional high resolution QPM, the speckle noise reduces the signal-to-noise ratio in the raw recordings, making it challenging to have phase unwrap and accurate phase retrieval.

Referring to FIGS. 13E and 13F, in one embodiment of the subject invention, after the synthetic aperture reconstruction, the standard deviation of the phase map is reduced from 0.66 rad to 0.1 rad and median of the temporal noise is reduced from 3.95 nm to 1.87 nm. The phase noise reductions are attributed to the phase mismatch correction and the incoherent addition in the aperture synthesis process. As the physical model precisely models the image formation process, the slowly fluctuating signals, originating from out-of-focal plane regions in the optical path, are averaged out and eliminated.

FIGS. 14A-14C show reconstruction with fewer scanning angles, wherein FIG. 14A shows reconstructed height profile of 40 scanning angles, FIG. 14B shows reconstructed height profile of 13 scanning angles, and FIG. 14C shows respective line profiles along the white line in FIG. 14A and FIG. 14B. An increase in the background noise is observed in FIG. 14B. Nevertheless, from the retrieved height profile the features can still be discerned without losing many details. The comparison shows that it is possible to reduce the number of scanning angles by more than 3 times, depending on the imaging application requirements. Thus, the number of illumination angles is significantly reduced without compromising image quality in order to achieve higher imaging speed.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Li, L.; Lin, H.; Huang, Y.; Shiue, R.-J.; Yadav, A.; Li, J.; Michon, J.; Englund, D.; Richardson, K.; Gu, T., High-performance flexible waveguide-integrated photodetectors. *Optica* 2018, 5 (1), 44-51.
2. Lin, H.; Song, Y.; Huang, Y.; Kita, D.; Deckoff-Jones, S.; Wang, K.; Li, L.; Li, J.; Zheng, H.; Luo, Z., Chalcogenide glass-on-graphene photonics. *Nature Photonics* 2017, 11 (12), 798.
3. Edwards, C.; Arbabi, A.; Popescu, G.; Goddard, L. L., Optically monitoring and controlling nanoscale topography during semiconductor etching. *Light: Science & Applications* 2012, 1 (9), e30-e30.
4. Edwards, C.; Arbabi, A.; Bhaduri, B.; Wang, X.; Ganti, R.; Yunker, P. J.; Yodh, A. G.; Popescu, G.; Goddard, L. L., Measuring the nonuniform evaporation dynamics of sprayed sessile microdroplets with quantitative phase imaging. *Langmuir* 2015, 31 (40), 11020-11032.
5. Bakal, C.; Aach, J.; Church, G.; Perrimon, N., Quantitative morphological signatures define local signaling networks regulating cell morphology. *science* 2007, 316 (5832), 1753-1756.
6. Goda, K.; Tsia, K.; Jalali, B., Serial time-encoded amplified imaging for real-time observation of fast dynamic phenomena. *Nature* 2009, 458 (7242), 1145.
7. Dardikman-Yoffe, G.; Mirsky, S. K.; Barnea, I.; Shaked, N. T., High-resolution 4-D acquisition of freely swimming human sperm cells without staining. *Science advances* 2020, 6 (15), eaay7619.
8. Wilson, L. G.; Carter, L. M.; Reece, S. E., High-speed holographic microscopy of malaria parasites reveals ambidextrous flagellar waveforms. *Proceedings of the National Academy of Sciences* 2013, 110 (47), 18769-18774.
9. Popescu, G., *Quantitative phase imaging of cells and tissues*. McGraw Hill Professional: 2011.
10. Zhou, R.; Edwards, C.; Arbabi, A.; Popescu, G.; Goddard, L. L., Detecting 20 nm wide defects in large area nanopatterns using optical interferometric microscopy. *Nano letters* 2013, 13 (8), 3716-3721.
11. Yang, Y.; Zhai, C.; Zeng, Q.; Khan, A. L.; Yu, H., Quantitative Amplitude and Phase Imaging with Interferometric Plasmonic Microscopy. *ACS nano* 2019, 13 (11), 13595-13601.

12. Park, Y.; Best, C. A.; Badizadegan, K.; Dasari, R. R.; Feld, M. S.; Kuriabova, T.; Henle, M. L.; Levine, A. J.; Popescu, G., Measurement of red blood cell mechanics during morphological changes. *Proceedings of the National Academy of Sciences* 2010, 107 (15), 6731-6736.
13. Park, Y.; Depeursinge, C.; Popescu, G., Quantitative phase imaging in biomedicine. *Nature Photonics* 2018, 12 (10), 578.
14. Greenbaum, A.; Luo, W.; Su, T.-W.; Göröcs, Z.; Xue, L.; Isikman, S. O.; Coskun, A. F.; Mudanyali, O.; Ozcan, A., Imaging without lenses: achievements and remaining challenges of wide-field on-chip microscopy. *Nature methods* 2012, 9 (9), 889.
15. Greenbaum, A.; Luo, W.; Khademhosseinieh, B.; Su, T.-W.; Coskun, A. F.; Ozcan, A., Increased space-bandwidth product in pixel super-resolved lensfree on-chip microscopy. *Scientific reports* 2013, 3, 1717.
16. Zheng, G.; Horstmeyer, R.; Yang, C., Wide-field, high-resolution Fourier ptychographic microscopy. *Nature photonics* 2013, 7 (9), 739.
17. Tian, L.; Liu, Z.; Yeh, L.-H.; Chen, M.; Zhong, J.; Waller, L., Computational illumination for high-speed in vitro Fourier ptychographic microscopy. *Optica* 2015, 2 (10), 904-911.
18. Kim, M.; Choi, Y.; Fang-Yen, C.; Sung, Y.; Dasari, R. R.; Feld, M. S.; Choi, W., High-speed synthetic aperture microscopy for live cell imaging. *Optics letters* 2011, 36 (2), 148-150.
19. Hillman, T. R.; Gutzler, T.; Alexandrov, S. A.; Sampson, D. D., High-resolution, wide-field object reconstruction with synthetic aperture Fourier holographic optical microscopy. *Optics express* 2009, 17 (10), 7873-7892.
20. Alexandrov, S. A.; Hillman, T. R.; Gutzler, T.; Sampson, D. D., Synthetic aperture Fourier holographic optical microscopy. *Physical review letters* 2006, 97 (16), 168102.
21. Feng, P.; Wen, X.; Lu, R., Long-working-distance synthetic aperture Fresnel off-axis digital holography. *Optics express* 2009, 17 (7), 5473-5480.
22. Di, J.; Zhao, J.; Jiang, H.; Zhang, P.; Fan, Q.; Sun, W., High resolution digital holographic microscopy with a wide field of view based on a synthetic aperture technique and use of linear CCD scanning. *Applied optics* 2008, 47 (30), 5654-5659.
23. Granero, L.; Micó, V.; Zalevsky, Z.; Garcia, J., Synthetic aperture superresolved microscopy in digital lensless Fourier holography by time and angular multiplexing of the object information. *Applied optics* 2010, 49 (5), 845-857.
24. Paturzo, M.; Ferraro, P., Correct self-assembling of spatial frequencies in super-resolution synthetic aperture digital holography. *Optics letters* 2009, 34 (23), 3650-3652.
25. Maire, G.; Giovannini, H.; Talneau, A.; Chaumet, P. C.; Belkebir, K.; Sentenac, A., Phase imaging and synthetic aperture super-resolution via total internal reflection microscopy. *Optics letters* 2018, 43 (9), 2173-2176.
26. Ralston, T. S.; Marks, D. L.; Carney, P. S.; Boppart, S. A., Interferometric synthetic aperture microscopy. *Nature Physics* 2007, 3 (2), 129.
27. Luo, W.; Greenbaum, A.; Zhang, Y.; Ozcan, A., Synthetic aperture-based on-chip microscopy. *Light: Science & Applications* 2015, 4 (3), e261.
28. Mico, V.; Zalevsky, Z.; Garcia-Martinez, P.; Garcia, J., Single-step superresolution by interferometric imaging. *Optics Express* 2004, 12 (12), 2589-2596.
29. Yuan, C.; Zhai, H.; Liu, H., Angular multiplexing in pulsed digital holography for aperture synthesis. *Optics letters* 2008, 33 (20), 2356-2358.
30. Lin, Y.-C.; Tu, H.-Y.; Wu, X.-R.; Lai, X.-J.; Cheng, C.-J., One-shot synthetic aperture digital holographic microscopy with non-coplanar angular-multiplexing and coherence gating. *Optics express* 2018, 26 (10), 12620-12631.
31. Picazo-Bueno, J. Á.; Zalevsky, Z.; García, J.; Micó, V., Superresolved spatially multiplexed interferometric microscopy. *Optics letters* 2017, 42 (5), 927-930.
32. Shin, S.; Kim, K.; Yoon, J.; Park, Y., Active illumination using a digital micromirror device for quantitative phase imaging. *Optics letters* 2015, 40 (22), 5407-5410.
33. Lee, K.; Kim, K.; Kim, G.; Shin, S.; Park, Y., Time-multiplexed structured illumination using a DMD for optical diffraction tomography. *Optics letters* 2017, 42 (5), 999-1002.
34. He, Y.; Wang, Y.; Zhou, R. In *Digital micromirror device based angle-multiplexed optical diffraction tomography for high throughput 3D imaging of cells*, Emerging Digital Micromirror Device Based Systems and Applications XII, International Society for Optics and Photonics: 2020; p 1129402.
35. Choi, W.; Fang-Yen, C.; Badizadegan, K.; Oh, S.; Lue, N.; Dasari, R. R.; Feld, M. S., Tomographic phase microscopy. *Nature methods* 2007, 4 (9), 717-719.
36. Kim, T.; Zhou, R.; Mir, M.; Babacan, S. D.; Carney, P. S.; Goddard, L. L.; Popescu, G., White-light diffraction tomography of unlabelled live cells. *Nature Photonics* 2014, 8 (3), 256-263.

We claim:

1. A system of high spatial and temporal resolution synthetic aperture phase microscopy (HISTR-SAPM) for imaging a sample, the system comprising:
   a fiber coupler receiving an input illumination beam, configured to provide a first illumination beam to propagate along a sample-illumination path and a second illumination beam to propagate along a reference-beam path;
   a first digital micromirror device (DMD) disposed in the sample-illumination path to receive the first illumination beam from the fiber coupler and configured to actively generate a plurality of sample illumination beams at different angles;
   a first lens disposed in the sample-illumination path to receive the sample illumination beams from the first DMD;
   a second DMD disposed in the sample-illumination path to receive the sample illumination beams from the first lens;
   a second lens and a third lens disposed in series in the sample-illumination path, sequentially receiving the sample illumination beams from the second DMD;
   a first scanning objective lens disposed in the sample-illumination path and at a first side adjacent to the sample to receive the sample illumination beams from the third lens and illuminate the sample illumination beams onto the sample;
   a beam splitter (BS) disposed in the reference-beam path to receive the second illumination beam from the fiber coupler;
   a fourth lens disposed in the reference-beam path to receive the second illumination beam from the BS;
   a second scanning objective lens disposed in the reference-beam path and at a second side adjacent to the sample wherein the second side is opposite to the first side, receiving the second illumination beam from the fourth lens and transmitting the second illumination beam to the sample, receiving a third illumination beam formed by the sample illumination beams transmitting through the sample combined with the second illumination beam reflected by the sample, and transmitting the third illumination beam to the fourth lens and the BS in sequence to form an interferogram at a final image plane.

2. The system of claim 1, wherein the fiber coupler is configured to have a 1×2 single-mode.

3. The system of claim 1, wherein the input illumination beam is a laser beam having a wavelength of any one of 405 nm, 488 nm, 532 nm, 633 nm, 800 nm, 1 µm, 1.3 µm, and 1.5 µm.

4. The system of claim 1, wherein the second DMD is configured to filter undesirable diffraction orders of the sample illumination beams from the first DMD.

5. The system of claim 1, wherein the first DMD is formed with a plurality of binary Lee holograms and the second DMD is formed with a plurality of spatial filtering maps corresponding to the plurality of binary Lee holograms, respectively.

6. The system of claim 1, further comprising a hardware trigger connection coupled to both the first DMD and the second DMD and configured to synchronize pattern switching between the first DMD and the second DMD.

7. The system of claim 1, wherein the first DMD is configured such that sizes of the micromirrors confine maximum scanning angles to be around 1° immediately after a first DMD plane.

8. The system of claim 1, wherein the first scanning objective lens and the second scanning objective lens have identical specifications.

9. The system of claim 1, wherein the fourth lens is a tube lens.

10. The system of claim 1, further comprising a fifth lens disposed in the sample-illumination path between the fiber coupler and the first DMD, receiving the first illumination beam from the fiber coupler and transmitting the first illumination beam to the first DMD.

11. The system of claim 10, further comprising a mirror disposed in the sample-illumination path between the fifth lens and the first DMD, receiving the first illumination beam from the fifth lens and reflecting the first illumination beam to the first DMD.

12. The system of claim 1, further comprising a mirror disposed in the sample-illumination path between the second DMD and the second lens, receiving the sample illumination beams from the second DMD and reflecting the sample illumination beams to the second lens.

13. The system of claim 12, wherein the first DMD, the mirror, the second DMD, the first, second, and third lenses, and the first scanning objective lens are configured to form two 4-f systems configured to amplify a scan angle range of the sample illumination beams illuminating on the sample.

14. The system of claim 1, further comprising a sixth lens disposed in the reference-beam path between the fiber coupler and the BS, receiving the second illumination beam from the fiber coupler and transmitting the second illumination beam to the BS.

15. A method of high spatial and temporal resolution synthetic aperture phase microscopy (HISTR-SAPM) for imaging a sample, the method comprising:

splitting an input illumination beam, by a fiber coupler, into a first illumination beam to propagate along a sample-illumination path and a second illumination beam to propagate along a reference-beam path;

transmitting the first illumination beam from the fiber coupler to a first digital micromirror device (DMD) disposed in the sample-illumination path, and configuring the first DMD to actively generate a plurality of sample illumination beams at different angles;

transmitting the sample illumination beams from the first DMD to a first lens disposed in the sample-illumination path;

transmitting the sample illumination beams from the first lens to a second DMD disposed in the sample-illumination path, and configuring the second DMD to filter undesirable diffraction orders of the sample illumination beams from the first DMD;

synchronize pattern switching between the first DMD and the second DMD;

sequentially transmitting the sample illumination beams from the second DMD to a second lens and a third lens, the second lens and the third lens being disposed in series in the sample-illumination path;

transmitting the sample illumination beams from the third lens to a first scanning objective lens disposed in the sample-illumination path and at a first side adjacent to the sample;

transmitting the sample illumination beams from the first scanning objective lens to the sample;

providing a mirror disposed in the sample-illumination path between the second DMD and the second lens, receiving the sample illumination beams from the second DMD and reflecting the sample illumination beams to the second lens;

wherein the first DMD, the mirror, the second DMD, the first, second, and third lenses, and the first scanning objective lens form two 4-f systems that are configured to amplify a scan angle range of the sample illumination beams transmitted onto the sample;

transmitting the second illumination beam from the fiber coupler to a beam splitter (BS) disposed in the reference-beam path;

transmitting the second illuminating beam from the BS to a fourth lens disposed in the reference-beam path;

transmitting the second illumination beam from the fourth lens to a second scanning objective lens disposed in the reference-beam path and at a second side adjacent to the sample wherein the second side is opposite to the first side;

transmitting the second illumination beam from the second scanning objective lens to the sample; and receiving, by the second scanning objective lens, a third illumination beam formed by the sample illumination beams transmitted through the sample combined with the second illumination beam reflected by the sample; and transmitting the third illumination beam to the fourth lens and the BS in sequence to form an interferogram at a final image plane.

16. The method of claim 15, wherein the first DMD is formed with a plurality of binary Lee holograms and the second DMD is formed with a plurality of spatial filtering maps corresponding to the plurality of binary Lee holograms, respectively.

17. The method of claim 16, further comprising synchronizing, by a hardware trigger connection, pattern switching between the first DMD and the second DMD.

18. The method of claim 16, wherein the first DMD is configured such that sizes of the micromirrors confine maximum scanning angles to be around 1° immediately after a first DMD plane.

19. The method of claim 16, wherein the first scanning objective lens and the second scanning objective lens have identical specifications.

\* \* \* \* \*